US010897646B2

(12) United States Patent
Di et al.

(10) Patent No.: US 10,897,646 B2
(45) Date of Patent: Jan. 19, 2021

(54) VIDEO STREAM TRANSMISSION METHOD AND RELATED DEVICE AND SYSTEM

(71) Applicant: HUAWEI TECHNOLOGIES CO., LTD., Guangdong (CN)

(72) Inventors: Peiyun Di, Shenzhen (CN); Qingpeng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/379,894

(22) Filed: Apr. 10, 2019

(65) Prior Publication Data

US 2019/0238933 A1    Aug. 1, 2019

Related U.S. Application Data

(63) Continuation of application No. PCT/CN2016/101920, filed on Oct. 12, 2016.

(30) Foreign Application Priority Data

Oct. 10, 2016  (CN) .......................... 2016 1 0886268

(51) Int. Cl.
    *H04N 21/44*    (2011.01)
    *H04N 21/437*    (2011.01)
    (Continued)

(52) U.S. Cl.
    CPC ..... *H04N 21/44012* (2013.01); *H04N 21/236* (2013.01); *H04N 21/2343* (2013.01);
    (Continued)

(58) Field of Classification Search
    CPC ........... H04N 21/44012; H04N 21/816; H04N 21/234345; H04N 21/236; H04N 21/4728;
    (Continued)

(56) References Cited

U.S. PATENT DOCUMENTS 6,567,427 B1      5/2003   Suzuki et al.
2011/0023066 A1*  1/2011   Jang ..................... H04N 21/482
                                                     725/54
(Continued)

FOREIGN PATENT DOCUMENTS

CN        1234941 A     11/1999
CN      101568018 A    10/2009
(Continued)

OTHER PUBLICATIONS

PCT International Search Report and Written Opinion issued in International Application No. PCT/CN2016/101920 dated Jul. 6, 2017, 18 pages (with English translation).

(Continued)

*Primary Examiner* — Mulugeta Mengesha
*Assistant Examiner* — Alazar Tilahun
(74) *Attorney, Agent, or Firm* — Fish & Richardson P.C.

(57) ABSTRACT

The present disclosure disclose example video stream transmission methods and related devices and systems. One example method includes sending, by a client, a target request to a server, where the target request includes information about a corresponding target spatial location of a target spatial object that needs to be presented upon request by the client in a virtual reality VR content component. A target request feedback by which the server responds to the target request is received by the client, where the target request feedback includes information about a multiplex video stream that is obtained by performing preset multiplexing processing on an original video stream corresponding to the target spatial object. Video parsing and presentation based on the information about the multiplex video stream is performed by the client.

16 Claims, 12 Drawing Sheets

(51) Int. Cl.
   *H04N 21/434*    (2011.01)
   *H04N 21/234*    (2011.01)
   *H04N 21/2343*   (2011.01)
   *H04N 21/81*     (2011.01)
   *H04N 21/236*    (2011.01)
   *H04N 21/4728*   (2011.01)
   *H04N 21/65*     (2011.01)

(52) U.S. Cl.
   CPC ............. *H04N 21/23412* (2013.01); *H04N 21/234345* (2013.01); *H04N 21/437* (2013.01); *H04N 21/4348* (2013.01); *H04N 21/4728* (2013.01); *H04N 21/65* (2013.01); *H04N 21/816* (2013.01)

(58) Field of Classification Search
   CPC .. H04N 21/65; H04N 21/437; H04N 21/2343; H04N 21/23412; H04N 21/4348
   See application file for complete search history.

(56) References Cited

U.S. PATENT DOCUMENTS

| | | |
|---|---|---|
| 2015/0032901 A1 | 1/2015 | Wang et al. |
| 2017/0301130 A1 | 10/2017 | Kasahara et al. |
| 2018/0324355 A1 | 11/2018 | Wang |
| 2019/0158815 A1* | 5/2019 | He ................ H04N 21/234345 |

FOREIGN PATENT DOCUMENTS

| | | |
|---|---|---|
| CN | 102737405 A | 10/2012 |
| CN | 103747283 A | 4/2014 |
| CN | 104735464 A | 6/2015 |
| CN | 105408916 A | 3/2016 |
| CN | 105554513 A | 5/2016 |
| CN | 105578199 A | 5/2016 |
| CN | 105704501 A | 6/2016 |
| CN | 105791882 A | 7/2016 |
| CN | 105915937 A | 8/2016 |
| CN | 105916060 A | 8/2016 |
| WO | 2015014773 A1 | 2/2015 |

OTHER PUBLICATIONS

Office Action issued in Chinese Application No. 201680086678.3 dated Jan. 19, 2020, 25 pages (with English translation).

Office Action issued in Chinese Application No. 201680086678.3 dated Sep. 7, 2020, 35 pages (with English translation).

\* cited by examiner

VIDEO STREAM TRANSMISSION METHOD AND RELATED DEVICE AND SYSTEM

CROSS-REFERENCE TO RELATED APPLICATIONS

This application is a continuation of International Application No. PCT/CN2016/101920, filed on Oct. 12, 2016, which claims priority to Chinese Patent Application No. 201610886268.9, filed on Oct. 10, 2016. The disclosures of the aforementioned applications are hereby incorporated by reference in their entireties.

TECHNICAL FIELD

The present disclosure relates to the field of video technologies, and in particular, to a video stream transmission method and a related device and system.

BACKGROUND

A virtual reality (Virtual Reality, VR) technology is a computer-simulated system that can create and be used to experience a virtual world. The VR technology generates a simulated environment by using a computer, to enable a user to immerse in the environment. Currently, the VR technology may be widely applied to various fields such as city planning, interior design, industrial simulation, historic site restoration, bridge and road design, real estate sales, tourism teaching, and education and training.

In the prior art, when the VR technology is applied to an existing video technology, 360-degree panorama video application that goes beyond a normal visual range of human eyes is implemented. Such video application gives people a new viewing mode and new visual experience, and also brings technological challenges. To be specific, a user can view VR video content at 360 degrees, for example, in a virtual reality live broadcast or recording broadcast system. However, a video stream of a VR video is relatively large, and a request and feedback process between a client and a server is relatively complex, and this may cause problems such as large transmission bandwidth consumption when the user watches the VR video on the client. Therefore, during preparation of the VR video content, the video content is divided into a plurality of spatial objects. When the user views VR video content, a spatial object corresponding to a viewport of the user is sent to the client for presentation. In this way, a volume of transmitted data can be reduced, but a new problem is also introduced. A viewport of the client may correspond to a plurality of spatial objects. As a result, the client needs to obtain bitstreams of the plurality of spatial objects, and the bitstreams of the plurality of spatial objects are presented synchronously after being decoded. Therefore, the client needs to wait until the bitstreams of the plurality of spatial objects are received before the client presents VR video content. This increases a delay of presenting a new viewport on the client, and affects user experience.

SUMMARY

A technical problem to be solved by embodiments of the present disclosure is to provide a video stream transmission method and a related device and system, to solve a problem of a large presentation delay in VR video experience in the prior art.

I. Introduction to an MPEG-DASH Technology

In November 2011, the MPEG organization approved the DASH standard. The DASH standard is a technical specification (hereinafter referred to as the DASH technical specification) for transmitting a media stream based on an HTTP protocol. The DASH technical specification mainly includes two parts: a media presentation description (English: Media Presentation Description, MPD) and a media file format (English: file format).

1. Media File Format

In DASH, a plurality of versions of bitstreams are prepared in a server for a same piece of video content. Each version of bitstream is referred to as a representation (English: representation) in the DASH standard. A representation is a set and an encapsulation of one or more bitstreams in a transmission format, and one representation includes one or more segments. Coding parameters, such as bit rates and resolutions, of bitstreams of different versions may be different. Each bitstream is divided into a plurality of small files, and each small file is referred to as a segment. In a process of requesting media segment data, a client may switch between different media representations. FIG. 1 is a schematic diagram of switchover between bitstream segments according to an embodiment of the present disclosure. Three different versions of bitstream data are prepared in a server for one movie. The three different versions of bitstream data are described in an MPD by using three representations (English: Representation, a rep for short hereinafter): a rep 1, a rep 2, and a rep 3. The rep 1 is a high-definition video with a bit rate of 4 mbps (megabit per second), the rep 2 is a standard-definition video with a bit rate of 2 mbps, and the rep 3 is a standard-definition video with a bit rate of 1 mbps. In FIG. 1, a segment marked with shade is segment data that the client requests to play. First three segments requested by the client are segments of the media representation rep 3. A fourth segment is switched to the rep 2. The client requests the fourth segment, and then switches to the rep 1 to request a fifth segment, a sixth segment, and the like. Segments of each representation may be stored in one file in a head-to-tail manner, or may be stored independently as individual small files. A segment may be encapsulated according to a format (ISO BMFF (Base Media File Format)) in ISO/IEC 14496-12, or may be encapsulated according to a format (MPEG-2 TS) in ISO/IEC 13818-1.

2. Media Presentation Description

In the DASH standard, a media presentation description is referred to as an MPD. The MPD may be an xml file. Information in the file is described in a hierarchical manner, as shown in FIG. 2. FIG. 2 is a hierarchical structural diagram of an mdp file according to an embodiment of the present disclosure. Information of an upper level is completely inherited by a next level. Some media metadata is described in the file. The media metadata can enable a client to learn of media content information in a server and construct an http-URL of a requested segment by using the information.

In the DASH standard, a media presentation (English: media presentation) is a set of structured data that presents media content. A media presentation description (English: media presentation description) is a file for describing a media presentation in a standardized manner, and is used to provide a streaming media service. Period (English: period): A group of consecutive periods constitute an entire media presentation, and periods are consecutive and non-overlapping. A representation (English: representation) is a structured data set in which one or more media content components (a media content component is an independent encoded media type, for example, audio or video) that have descriptive metadata are encapsulated. To be specific, a representation is a set and an encapsulation of one or more bitstreams in a transmission format, and one representation includes one or more segments. An adaption set (English: Adaptation Set) is a set of a plurality of interchangeable code versions that represent a same media content component. One adaptation set includes one or more representations. A subset (English: subset) is a combination of a group of adaptation sets. When a player plays all the adaptation sets in the subset, corresponding media content can be obtained. Segment information is a media unit to which an HTTP uniform resource locator in a media presentation description references, and the segment information describes a segment of media data. Segments of media data may be stored in one file or may be stored independently. In a possible manner, an MPD stores a segment of media data.

For technological concepts related to the MPEG-DASH technology in the present disclosure, refer to related stipulations in ISO/IEC 23009-1:2014 Information technology—Dynamic adaptive streaming over HTTP (DASH)—Part 1: Media presentation description and segment formats, or refer to related stipulations in a historical standard version, for example, ISO/IEC 23009-1:2013 or ISO/IEC 23009-1:2012.

II. Introduction to the Virtual Reality (Virtual Reality, VR) Technology

The virtual reality technology is a computer-simulated system that can create and be used to experience a virtual world. The VR technology generates a simulated environment by using a computer. The simulated environment integrates information from a plurality of sources, is system simulation of interactive three-dimensional dynamic vision and a physical behavior, and can enable a user to immerse in the environment. The VR mainly includes aspects such as a simulated environment, sensations, natural skills, and a sensor device. The simulated environment is a real-time dynamic three-dimensional vivid picture generated by a computer. Sensations mean that ideal VR should have all the sensations people have, including sensations such as hearing, touch, force sensing, and movement in addition to a visual sensation generated by a computer graphics technology, and even including smell, taste, and the like. This is also referred to as multi-sensation. The natural skills include head movement, eyes movement, a gesture, or another human body behavior action of a person. A computer processes data adapted to an action of a participant, responds to an input of the user in real time, and separately feeds the response back to five sense organs of the user. The sensor device is a three-dimensional interactive device. When a VR video (or a 360-degree video or an omnidirectional video (English: Omnidirectional video)) is presented on a head-mounted device or a handheld device, only a video picture of a part corresponding to an orientation of the head of the user is presented, and associated audio is presented.

A difference between the VR video and a normal video (English: normal video) lies in that entire video content of the normal video is presented to a user, and only a subset of the entire video of the VR video is presented to a user (in VR typically only a subset of the entire video region represented by the video pictures).

III. Spatial Descriptions in the Existing DASH Standard

In the existing standard, original text that describes spatial information is as follows: "The SRD scheme allows Media Presentation authors to express spatial relationships between Spatial Objects. A Spatial Object is defined as a spatial part of a content component (e.g. a region of interest, or a tile) and represented by either an Adaptation Set or a Sub-Representation."

An MPD describes spatial relationships (namely spatial relationships) between spatial objects (namely Spatial Objects). A spatial object is defined as some space of a content component, for example, an existing region of interest (English: region of interest, ROI) and a tile. A spatial relationship may be described in an adaptation set and a sub-representation. In the existing DASH standard, some descriptor elements are defined in the MPD, and each descriptor element has two properties: schemeIdURI and value. The schemeIdURI describes what the current descriptor is, and the value is a parameter value of the descriptor. The existing standard already has two descriptors: SupplementalProperty and EssentialProperty (which are a supplemental property descriptor and an essential property descriptor). In the existing standard, if schemeIdURI of the two descriptors="urn:mpeg:dash:srd:2014" or (schemeIdURI=urn:mpeg:dash:VR:2017), it indicates that the descriptors describe spatial information associated to a spatial object (spatial information associated to the containing Spatial Object.), and a series of parameter values of an SDR are listed in a corresponding value. Table 1 describes syntax of specific values.

TABLE 1

| EssentialProperty-@value or SupplementalProperty@value parameter | Use | Description |
| --- | --- | --- |
| source_id | M | Non-negative integer, providing a content source identifier |
| x | M | Non-negative integer in decimal representation expressing the horizontal position of the top-left corner of the spatial object in arbitrary units Horizontal position of a top-left corner of a spatial object in arbitrary units |
| y | M | Non-negative integer in decimal representation expressing the vertical position of the top-left corner of the spatial object in arbitrary units. Vertical position of a top-left corner of a spatial object. |
| w | M | Non-negative integer in decimal representation expressing the width of the spatial object in arbitrary units. Width of a spatial object. |
| h | M | Non-negative integer in decimal representation expressing the height of the spatial object in arbitrary units. Height of a spatial object. |
| W | O | Optional non-negative integer in decimal representation expressing the width of the reference space in arbitrary units. Width of a reference space When the value W is present, the value H shall be present. |
| H | O | Height of a reference space |
| spatial_set_id | O | Optional non-negative integer in decimal representation providing an identifier for a group of spatial object. Group of a spatial object. |

Legend:
M = Mandatory,
O = Optional

FIG. 3 is a schematic diagram of a spatial relationship between spatial objects according to an embodiment of the present disclosure. A picture AS may be set as a content component. An AS 1, an AS 2, an AS 3, and an AS 4 are four spatial objects included in the AS. Each spatial object is associated to one space. An MPD describes a spatial relationship between spatial objects, for example, a relationship between spaces associated to the spatial objects.

An example of an MPD is as follows:

```
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:schema:mpd:2011 DASH-MPD.xsd"
    [ . . . ]>
<Period>
    <AdaptationSet . . . ]>
<SupplementalProperty schemeIdUri="urn:mpeg:dash:srd:2014"
    value="1, 0, 0, 1920, 1080, 1920, 1080, 1"/><!-- A video source identifier is 1, top-left coordinates of a spatial object are (0, 0), a length and a width of the spatial object are (1920, 1080), a space to which the spatial object references is (1920, 1080), and a spatial object group ID is 1. Herein, length and width of the spatial object=space to which the spatial object references. Therefore, a representation in a representation 1 (id=1) corresponds to entire video content. -->
    <Representation id="1" bandwidth="1000000">
    <BaseURL>video-1.mp4</BaseURL>
    </Representation>
    . . .
    <Representation id="11" bandwidth="3000000">
    <BaseURL>video-11.mp4</BaseURL>
    </Representation>
</AdaptationSet>
    <AdaptationSet [ . . . ]>
<EssentialProperty schemeIdUri="urn:mpeg:dash:srd:2014"
    value="1, 0, 0, 1920, 1080, 3840, 2160, 2"/><!--A video source identifier is 1 (a same content source as the foregoing video source), top-left coordinates of a spatial object is (0, 0), a length and a width of the spatial object are (1920, 1080), a space to which the spatial object references is (3840, 2160), and a spatial object group ID is 2. Herein, the length and the width of the spatial object is one-fourth a size of the space to which the spatial object references. According to the coordinates, the spatial object is a spatial in a top-left corner, that is, the AS 1. A representation in a representation 2 corresponds to content in the AS 1. Similarly, a description of another spatial object is the same as the following description of a related descriptor. Spatial objects having a same spatial object group ID belong to same video content. -->
    <Representation id="2" bandwidth="4500000">
    <BaseURL>video-2.mp4</BaseURL>
    </Representation>
</AdaptationSet>
    <AdaptationSet [ . . . ]>
<EssentialProperty schemeIdUri="urn:mpeg:dash:srd:2014"
    value="1, 1920, 0, 1920, 1080, 3840, 2160, 2"/>
    <Representation id="video-3" bandwidth="2000000">
    <BaseURL>video-3.mp4</BaseURL>
    </Representation>
</AdaptationSet>
    [ . . . ]
    <AdaptationSet [ . . . ]>
<EssentialProperty schemeIdUri="urn:mpeg:dash:srd:2014"
    value="1, 1920, 1080, 1920, 1080, 3840, 2160, 2"/>
    <Representation id="5" bandwidth="1500000">
    <BaseURL>video-5.mp4</BaseURL>
    </Representation>
</AdaptationSet>
    <!-- Last level -->
    <AdaptationSet [ . . . ]>
<EssentialProperty schemeIdUri="urn:mpeg:dash:srd:2014"
    value="1, 0, 0, 1920, 1080, 7680, 4320, 3"/>
    <Representation id="6" bandwidth="3500000">
    <BaseURL>video-6.mp4</BaseURL>
    </Representation>
</AdaptationSet>
    [ . . . ]
    <AdaptationSet [ . . . ]>
<EssentialProperty schemeIdUri="urn:mpeg:dash:srd:2014"
    value="1, 5760, 3240, 1920, 1080, 7680, 4320, 3"/>
    <Representation id="21" bandwidth="4000000">
    <BaseURL>video-21.mp4</BaseURL>
    </Representation>
</AdaptationSet>
</Period>
</MPD>
```

The top-left coordinates of the spatial object, the length and the width of the spatial object, and the space to which the spatial object references may also be relative values. For example, value="1, 0, 0, 1920, 1080, 3840, 2160, 2" may be described as value="1, 0, 0, 1, 1, 2, 2, 2".

FIG. 16 shows a method by which a server multiplexes a bitstream of a spatial object corresponding to a viewport (English: viewport, FOV) of a client. The client initiates an ROI request to the server, and the server multiplexes a segment of a spatial object corresponding to an ROI region and sends a multiplex segment to the client. The method may be applied to MPEG-DASH technology-based interaction between a client and a server.

According to a first aspect, an embodiment of the present disclosure provides a video stream transmission method, and the method may include:

sending, by a client, a target request to a server, where the target request includes information about a corresponding target spatial location, of a target spatial object that needs to be presented upon request by the client, in a virtual reality VR content component; receiving, by the client, a target request feedback by which the server responds to the target request, where the target request feedback includes information about a multiplex video stream that is obtained by performing preset multiplexing processing on an original video stream corresponding to the target spatial object; and performing, by the client, video parsing and presentation based on the information about the multiplex video stream. To be specific, preset multiplexing processing is performed on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

With reference to the first aspect, in a first possible implementation, the information about the multiplex video stream includes information about N multiplexed sub video streams that are respectively obtained by performing preset multiplexing processing on N sub video streams, the N sub video streams are corresponding sub video streams generated by dividing the target spatial object into N sub spatial objects and encoding the N sub spatial objects, N is a natural number greater than 1, the target request feedback further includes multiplexing description information, and the multiplexing description information includes at least one of the following: a quantity N of the sub video streams that is included in the information about the multiplex video stream; a starting location offset, in the information about the multiplex video stream, of a starting sub video stream of the N sub video streams; data volume information of the N multiplexed sub video streams; spatial location information, in the VR content component, respectively corresponding to the N multiplexed sub video streams; resolution information of the N multiplexed sub video streams; and a video stream multiplexing type of the N multiplexed sub video streams. The target request feedback carries the multiplexing description information, so that the client can parse and present the multiplex video stream based on content in the multiplexing description information.

With reference to the first possible implementation of the first aspect, in a second possible implementation, the multiplexing description information further includes: the spatial location information, in the VR content component, respectively corresponding to the N multiplexed sub video streams. The client finally presents a parsed video stream based on the spatial location information, in the VR content component, respectively corresponding to the N multiplexed sub video streams.

With reference to the first possible implementation of the first aspect, in a second possible implementation, the target request includes at least one of the following: an identifier of a media representation, viewport information of a user of the client, or spatial information of the media representation. The server obtains, based on the target request, the N sub video streams for multiplexing.

With reference to the first possible implementation of the first aspect or the second possible implementation of the first aspect, in a third possible implementation, the multiplexing description information further includes: spatial location information, in the VR content component, respectively corresponding to the N sub video streams. Therefore, the client can learn of, at any time based on spatial location information of a video stream, a viewport of which a sub video stream is requested, so that when content of the same viewport needs to be viewed subsequently, it is unnecessary to request repeatedly, thereby improving transmission efficiency of a VR video and improving user experience.

With reference to the first aspect, the first possible implementation of the first aspect, the second possible implementation of the first aspect, or the third possible implementation of the first aspect, in a fourth possible implementation, the target request further includes at least one of: region of interest ROI information, bandwidth information of the client, information about a decoding standard supported by the client, and information about a maximum video resolution of the client. When initiating a video request, the client may further add some related parameters of the client, for example, a video playing condition or playing performance, so that the server can perform video stream processing and feedback more properly.

With reference to the first aspect, the first possible implementation of the first aspect, the second possible implementation of the first aspect, the third possible implementation of the first aspect, or the fourth possible implementation of the first aspect, in a fifth possible implementation, the preset multiplexing processing includes binary head-to-tail splicing processing on the video stream, binary head-to-tail splicing of video segments, or sample interleaving multiplexing processing. There may be a plurality of preset multiplexing processing manners, to meet different processing requirements of different VR videos.

According to a second aspect, an embodiment of the present disclosure provides a video stream transmission method, and the method may include:

receiving, by a server, a target request sent by a client, where the target request includes information about a corresponding target spatial location, of a target spatial object that needs to be presented upon request by the client, in a virtual reality VR content component; searching, by the server based on the target spatial location information, for the corresponding target spatial object in the VR content component; obtaining, by the server, information about a multiplex video stream that is obtained by performing preset multiplexing processing on a video stream corresponding to the target spatial object; and sending, by the server, a target request feedback to the client in response to the target request, where the target request feedback includes the information about the multiplex video stream. In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

With reference to the second aspect, in a first possible implementation, the obtaining, by the server, information about a multiplex video stream that is obtained by performing preset multiplexing processing on an original video stream corresponding to the target spatial object includes:

dividing, by the server, the target spatial object into N sub spatial objects, and encoding the N sub spatial objects to generate N corresponding sub video streams, where N is natural number greater than 1; and obtaining, by the server, information about N multiplexed sub video streams that are obtained by separately performing the preset multiplexing processing on the N sub video streams.

With reference to the first possible implementation of the second aspect, in a second possible implementation, the target request feedback further includes multiplexing description information, and the multiplexing description information includes at least one of the following: a quantity N of the sub video streams that is included in the information about the multiplex video stream; a starting location offset, in the information about the multiplex video stream, of a starting sub video stream of the N sub video streams; a data volume of the N multiplexed sub video streams; spatial location information, in the VR content component, respectively corresponding to the N multiplexed sub video streams; resolution information of the N multiplexed sub video streams; and a video stream multiplexing type of the N multiplexed sub video streams.

With reference to the second implementation of the second aspect, in a third possible implementation, the multiplexing description information further includes: the spatial location information, in the VR content component, respectively corresponding to the N multiplexed sub video streams.

With reference to the second possible implementation of the second aspect or the third possible implementation of the second aspect, in a fourth possible implementation, the multiplexing description information further includes: spatial location information, in the VR content component, respectively corresponding to the N sub video streams.

With reference to the second aspect, the first possible implementation of the second aspect, the second possible implementation of the second aspect, the third possible implementation of the second aspect, or the fourth possible implementation of the second aspect, in a fifth possible implementation, the preset multiplexing processing includes binary head-to-tail splicing processing on video streams, or binary head-to-tail splicing processing or interleaving multiplexing processing on video segments.

According to a third aspect, an embodiment of the present disclosure provides a client, and the client may include:

a request module, configured to send a target request to a server, where the target request includes at least one of the following: information about a corresponding target spatial location, of a target spatial object that needs to be presented upon request by the client, in a virtual reality VR content component, an identifier of a media representation, viewport information of a user of the client, or spatial information of the media representation;

a receiving module, configured to receive a target request feedback by which the server responds to the target request, where the target request feedback includes information about a multiplex video stream that is obtained by performing preset multiplexing processing on an original video stream corresponding to the target spatial object; and a processing module, configured to perform video parsing and presentation based on the information about the multiplex video stream.

With reference to the third aspect, in a first possible implementation, the information about the multiplex video stream includes information about N multiplexed sub video streams that are respectively obtained by performing preset multiplexing processing on N sub video streams, the N sub video streams are corresponding sub video streams generated by dividing the target spatial object into N sub spatial objects and encoding the N sub spatial objects, N is a natural number greater than 1, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a data volume of the N multiplexed sub video streams;

spatial location information, in the VR content component, respectively corresponding to the N multiplexed sub video streams;

resolution information of the N multiplexed sub video streams; and a video stream multiplexing type of the N multiplexed sub video streams.

With reference to the first possible implementation of the third aspect, in a second possible implementation, the multiplexing description information further includes: the spatial location information, in the VR content component, respectively corresponding to the N multiplexed sub video streams.

With reference to the first possible implementation of the third aspect or the second possible implementation of the third aspect, in a third possible implementation, the multiplexing description information further includes: spatial location information, in the VR content component, respectively corresponding to the N sub video streams.

With reference to the third aspect, the first possible implementation of the third aspect, the second possible implementation of the third aspect, or the third possible implementation of the third aspect, in a fourth possible implementation, the target request further includes at least one of: region of interest ROI information, bandwidth information of the client, information about a decoding standard supported by the client, and information about a maximum video resolution of the client.

With reference to the third aspect, the first possible implementation of the third aspect, the second possible implementation of the third aspect, the third possible implementation of the third aspect, or the fourth possible implementation of the third aspect, in a fifth possible implementation, the preset multiplexing processing includes binary head-to-tail splicing processing on the video stream, binary head-to-tail splicing of video segments, or sample interleaving multiplexing processing.

According to a fourth aspect, an embodiment of the present disclosure provides a server, and the server may include:

a receiving module, configured to receive a target request sent by a client, where the target request includes at least one of the following: information about a corresponding target spatial location, of a target spatial object that needs to be presented upon request by the client, in a virtual reality VR content component, an identifier of a media representation, viewport information of a user of the client, or spatial information of the media representation;

a parsing module, configured to search, based on the target spatial location information, for the corresponding target spatial object in the VR content component;

an obtaining module, configured to obtain information about a multiplex video stream that is obtained by performing preset multiplexing processing on an original video stream corresponding to the target spatial object; and a feedback module, configured to send a target request feedback to the client in response to the target request, where the target request feedback includes the information about the multiplex video stream.

With reference to the fourth aspect, in a first possible implementation, the obtaining module includes:

a dividing unit, configured to divide the target spatial object into N sub spatial objects, and encode the N sub spatial objects to generate N corresponding sub video streams, where N is natural number greater than 1; and an obtaining unit, configured to obtain information about N multiplexed sub video streams that are obtained by separately performing the preset multiplexing processing on the N sub video streams.

With reference to the first possible implementation of the fourth aspect, in a second possible implementation, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a size of the N multiplexed sub video streams;

spatial location information, in the VR content component, respectively corresponding to the N multiplexed sub video streams;

resolution information of the N multiplexed sub video streams; and a video stream multiplexing type of the N multiplexed sub video streams.

With reference to the second possible implementation of the fourth aspect, in a third possible implementation, the multiplexing description information further includes:

the spatial location information, in the VR content component, respectively corresponding to the N multiplexed sub video streams.

With reference to the second possible implementation of the fourth aspect or the third possible implementation of the fourth aspect, in a fourth possible implementation, the multiplexing description information further includes: spatial location information, in the VR content component, respectively corresponding to the N sub video streams.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation, the preset multiplexing processing includes binary head-to-tail splicing processing on the video stream, binary head-to-tail splicing of video segments, or sample interleaving multiplexing processing.

According to a fifth aspect, an embodiment of the present disclosure provides a client, and the client may include a processor, a memory, and a transceiver, where the memory is configured to store an instruction, and the processor is configured to call the instruction stored in the memory to perform some or all steps described in any method according to the first aspect of the embodiments of the present disclosure.

According to a sixth aspect, an embodiment of the present disclosure provides a server, and the server may include a processor, a memory, and a transceiver, where the memory is configured to store an instruction, and the processor is configured to call the instruction stored in the memory to perform some or all steps described in any method according to the second aspect of the embodiments of the present disclosure.

An embodiment of a seventh aspect of the present disclosure provides a streaming technology-based video data processing method, and the method includes:

receiving, by a server, a video data obtaining request sent by a client, where the obtaining request includes spatial object information;

determining, by the server based on the spatial object information, video data corresponding to at least two media representations;

encapsulating, by the server, the video data corresponding to the at least two media representations into a bitstream; and sending, by the server, the bitstream to the client.

In a possible implementation, the spatial object information includes at least one of the following:

an identifier of a media representation, viewport information of a user of the client, or spatial information of the media representation.

In a possible implementation, the bitstream includes at least one of the following information:

a quantity of the media representations;

a starting location offset of the media representation in the bitstream;

data volume information of the media representation;

spatial location information corresponding to the media representation;

a video stream multiplexing type of the media representation;

or resolution information of the media representation.

In a possible implementation, the bitstream includes an encapsulation identifier, and the identifier is used to indicate whether the bitstream uses a segment interleaving encapsulation manner or the bitstream uses a sample interleaving encapsulation manner.

An embodiment of an eighth aspect of the present disclosure provides a streaming technology-based video data processing method, and the method includes:

sending, by a client, a video data obtaining request to a server, where the obtaining request includes spatial object information; and receiving, by the client, a bitstream sent by the server after responding to the video data obtaining request, where the bitstream includes data of at least two media representations.

In a possible implementation, the spatial object information includes at least one of the following:

an identifier of a media representation, viewport information of a user of the client, or spatial information of the media representation.

In a possible implementation, the bitstream includes at least one of the following information:

a quantity of the media representations;

a starting location offset of the media representation in the bitstream;

data volume information of the media representation;

spatial location information corresponding to the media representation;

a video stream multiplexing type of the media representation;

or resolution information of the media representation.

In a possible implementation, the bitstream includes an encapsulation identifier, and the identifier is used to indicate whether the bitstream uses a segment interleaving encapsulation manner or the bitstream uses a sample interleaving encapsulation manner.

An embodiment of a ninth aspect of the present disclosure provides a streaming technology-based server, and the server includes:

a receiver, configured to receive a video data obtaining request sent by a client, where the obtaining request includes spatial object information;

a processor, configured to determine, based on the spatial object information, video data corresponding to at least two media representations, where the processor is further configured to encapsulate the video data corresponding to the at least two media representations into a bitstream; and a transmitter, configured to send the bitstream to the client.

In a possible implementation, the spatial object information includes at least one of the following:

an identifier of a media representation, viewport information of a user of the client, or spatial information of the media representation.

In a possible implementation, the bitstream includes at least one of the following information:

a quantity of the media representations;

a starting location offset of the media representation in the bitstream;

data volume information of the media representation;

spatial location information corresponding to the media representation;

a video stream multiplexing type of the media representation;

or resolution information of the media representation.

In a possible implementation, the bitstream includes an encapsulation identifier, and the identifier is used to indicate whether the bitstream uses a segment interleaving encapsulation manner or the bitstream uses a sample interleaving encapsulation manner.

An embodiment of a tenth aspect of the present disclosure provides a streaming technology-based client, and the client includes:

a transmitter, configured to send a video data obtaining request to a server, where the obtaining request includes spatial object information; and a receiver, configured to receive a bitstream sent by the server after responding to the video data obtaining request, where the bitstream includes data of at least two media representations.

In a possible implementation, the spatial object information includes at least one of the following:

an identifier of a media representation, viewport information of a user of the client, or spatial information of the media representation.

In a possible implementation, the bitstream includes at least one of the following information:

a quantity of the media representations;

a starting location offset of the media representation in the bitstream;

data volume information of the media representation;

spatial location information corresponding to the media representation;

a video stream multiplexing type of the media representation;

or resolution information of the media representation.

In a possible implementation, the bitstream includes an encapsulation identifier, and the identifier is used to indicate whether the bitstream uses a segment interleaving encapsulation manner or the bitstream uses a sample interleaving encapsulation manner.

Beneficial effects of the embodiments of the present disclosure are as follows:

In the embodiments of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

BRIEF DESCRIPTION OF DRAWINGS

To describe the technical solutions in the embodiments of the present disclosure more clearly, the following briefly describes the accompanying drawings required for describing the embodiments or the prior art.

DESCRIPTION OF EMBODIMENTS

Figure 1:
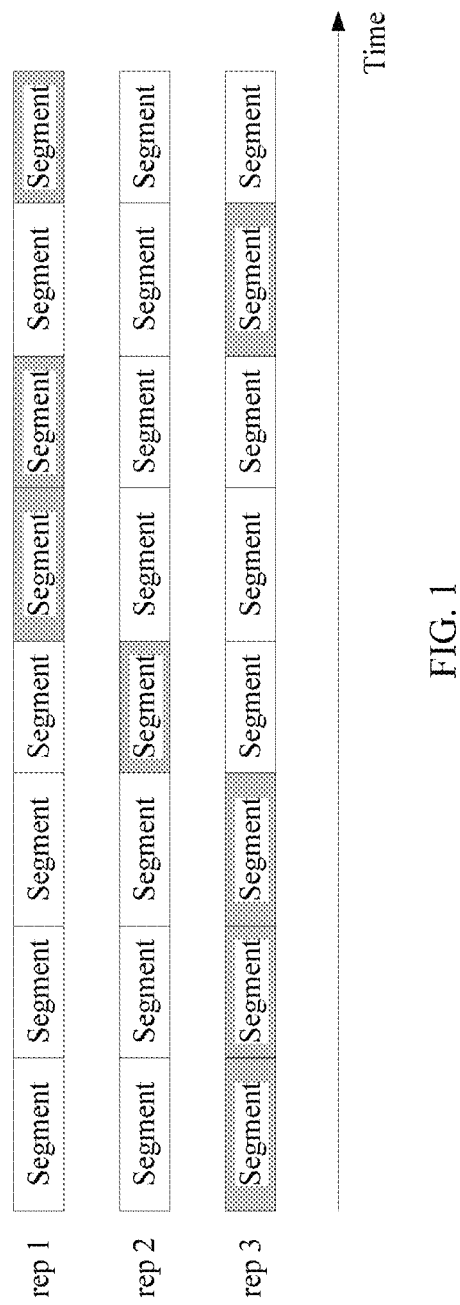
FIG. 1 is a schematic diagram of handover between bitstream segments according to an embodiment of the present disclosure.

The following clearly describes the technical solutions in the embodiments of the present disclosure with reference to the accompanying drawings in the embodiments of the present disclosure.

In the specification, claims, and accompanying drawings of the present disclosure, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

In the following, some terms in this application are described, to help persons skilled in the art have a better understanding.

(1) A client may be installed on a terminal device in a form of software or App, or may be a client existing on a terminal device (for example, a terminal device supporting VR video watching) in a form of an inherent functional component inside a system. In other words, a client in the present disclosure is a terminal device on which the client is successfully installed. The terminal device includes but is not limited to various forms of user equipment (User Equipment, UE) that can provide VR video watching experience, for example, an access terminal, a terminal device, a subscriber unit, a subscriber station, a mobile site, a mobile station, a remote station, a remote terminal, a mobile device, a user terminal, a terminal, a wireless communications device, a user agent or a user apparatus, a cellular phone, a cordless phone, a smartphone, a tablet computer, a Session Initiation Protocol (Session Initiation Protocol, SIP) phone, a wireless local loop (Wireless Local Loop, WLL) station, a smart band, a smart wearable device (such as smart glasses or a smart helmet), an MP3 player (Moving Picture Experts Group Audio Layer III, Moving Picture Experts Group Audio Layer III), an MP4 (Moving Picture Experts Group Audio Layer IV, Moving Picture Experts Group Audio Layer III) player, a personal digital assistant (Personal Digital Assistant, PDA), a handheld device or a computer device having a wireless communications function, another processing device or an in-vehicle device connected to a wireless modem, and a terminal device in a future 5G network.

(2) A server is a cloud service device, a terminal device, a core network device, or the like that can store a large quantity of VR video files, complete request-based interaction with a client, and implement processing operations such as encoding, decoding, and multiplexing on a VR video.

(3) "A plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

Figure 4:
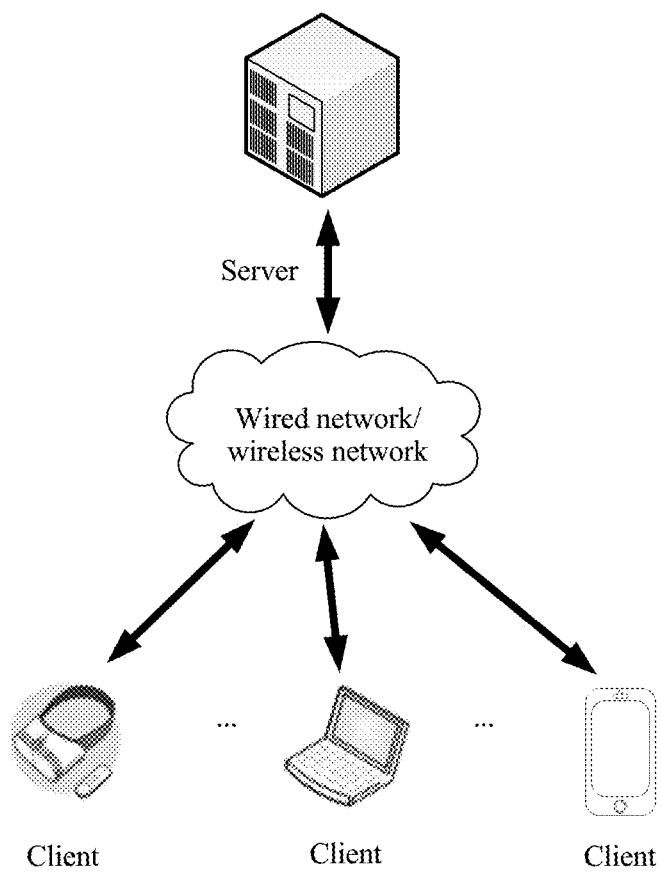
FIG. 4 is a schematic diagram of a network architecture of a video stream transmission system according to an embodiment of the present disclosure.

To facilitate understanding of the embodiments of the present disclosure, the following first describes a network architecture of a video stream transmission system on which the embodiments of the present disclosure are based. FIG. 4 is a schematic diagram of a network architecture of a video stream transmission system according to an embodiment of the present disclosure. Referring to FIG. 4, the system includes a client and a server. A user may use the client to initiate a VR video request to the server by using a wired network or a wireless network. After receiving the request, the server feeds corresponding VR video content back to the client in response to the VR video request. Finally, the client parses the VR video content that is fed back, and presents a VR video effect to the user. In other words, the user implements VR video experience by using video stream interaction between the client and the server.

In the embodiments of the present disclosure, a function of the client includes but is not limited to: sending a VR video request to a client based on current viewport information of the client, where the request carries the viewport information of the client, multiplexing description information, or the like. A function of the server includes but is not limited to: managing description information of all media stream files of a VR video, where the description information includes spatial location information of video stream content in the VR video; obtaining request information from the client and parsing viewport information carried in a request; reading, based on the viewport information, a video stream corresponding to a viewport; and encapsulating and multiplexing a video stream related to a viewport of a user, where an encapsulated and multiplexed file includes multiplexing description information of each viewport. It can be understood that, alternatively, the server may be a logical module on a content delivery network (Content Delivery Network, CDN). It can be understood that the foregoing network architecture is only one of the implementations of the embodiments of the present disclosure. The network architecture in the embodiments of the present disclosure includes but is not limited to the foregoing network architecture. Any network architecture that can implement a video stream transmission method of the present disclosure shall fall within a protected and covered scope of the present disclosure.

Figure 5:
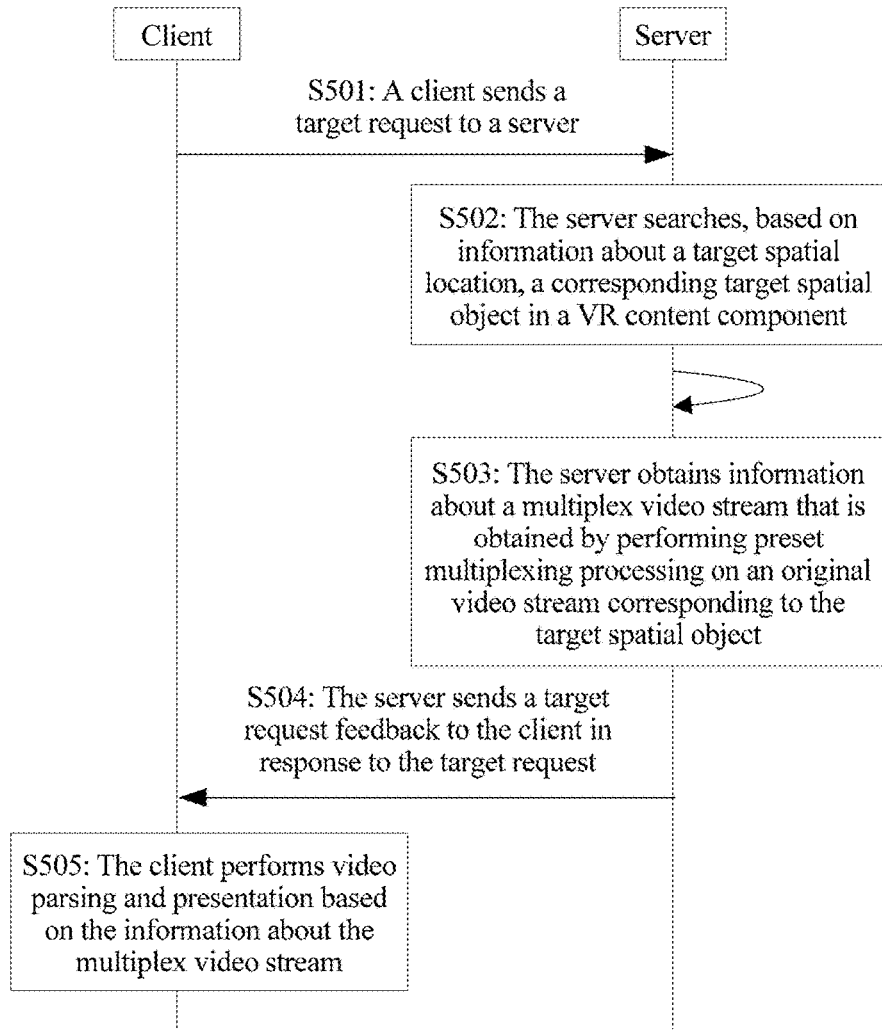
FIG. 5 is a schematic flowchart of a video stream transmission method according to an embodiment of the present disclosure.

FIG. 5 is a schematic flowchart of a video stream transmission method according to an embodiment of the present disclosure. The following describes in detail the video stream transmission method in this embodiment of the present disclosure from a perspective of interaction between a client and a server with reference to FIG. 5. The method may include the following steps S501 to S505.

Step S501: The client sends a target request to the server, and the server receives the target request sent by the client, where the target request includes at least one of the following: information about a corresponding target spatial location, of a target spatial object that needs to be presented upon request by the client, in a virtual reality VR content component, an identifier of a media representation, viewport information of a user of the client, or spatial information of the media representation.

A spatial object (Spatial Objects) is a part of space of a content component. In other words, a content component includes a plurality of spatial objects. In general, during application to a VR video, it can be understood that the VR video includes sub videos corresponding to a plurality of fields of view. An identifier of a media representation is an identifier of a sub video stream. Viewport information of a user of the client is spatial object information. To be specific, in this embodiment of the present disclosure, a VR content component may be a VR video. The target spatial object may be a part of a viewport, in the VR video, that needs to be presented upon request by the user, and may be referred as a region of interest (Region of Interest, ROI). In machine visual and picture processing, a to-be-processed region in a processed picture is outlined by a box, a circle, an ellipse, an irregular polygon, or the like and is referred to as a region of interest.

A difference between a VR video and a normal video lies in that entire video content of the normal video is presented to a user, and only a subset (a sub video) of the entire video of the VR video is presented. To be specific, when the VR video (or a 360-degree video or an omnidirectional video (Omnidirectional video)) is presented on a head-mounted device or a handheld device, only an area of an orientation corresponding to the head of the user in the VR video and associated audio are finally presented. Therefore, the target spatial location information carried in the target request may be considered as a region of a viewport that the user is currently interested in and that needs to be presented. It can be understood that the target request may be triggered by an angle movement of the client, or may be triggered by a related input instruction of the user or the like. The present disclosure sets no limitation thereto.

Figure 6:
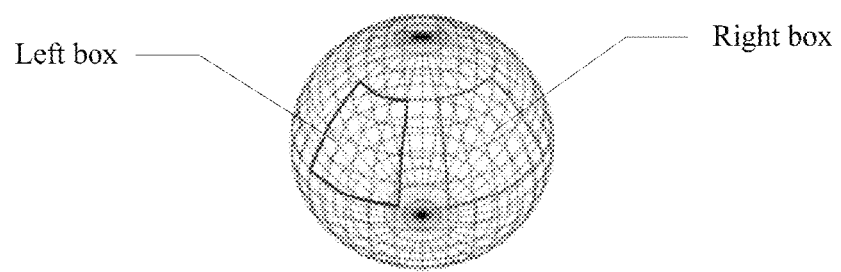
FIG. 6 is a diagram of a change of a 360-degree viewport according to an embodiment of the present disclosure.

For example, the user may watch the VR video at 360 degrees. However, at each moment, a video display region viewed by the user is only a part of the VR video. Therefore, during content preparation, VR content is divided into plurality of regions, and each region corresponds to a group of adaptive bitstreams. The client selects, based on a region viewed by the user, a corresponding video bitstream for receiving and viewing. FIG. 6 is a diagram of a change of a 360-degree viewport according to an embodiment of the present disclosure. In FIG. 6, content in a left box and content in a right box are respectively two fields of view regions of a user. When the user watches a video, the user switches a viewport from the left box to the right box by using an operation (for example, by rotating a smart helmet). After the viewport of the user is switched to the right box, a client also needs to present video content of the corresponding viewport region. Because the user views content at an arbitrary viewport location, when the user views content at a viewport, content of the viewport appears in a plurality of regions obtained by dividing VR, and the user needs to obtain video streams of more regions. It can be understood that, in existing 2D picture mapping of a VR, besides being mapped to a coordinates graph (longitude and latitude graph), a spherical surface in FIG. 6 may be mapped to another geometrical body, such as a cube or a polyhedron. The following mainly describes a 2D mapping manner of being mapped to longitude and latitude graph. Other mapping manners also fall within the scope protected and covered by the present disclosure.

Figure 7:
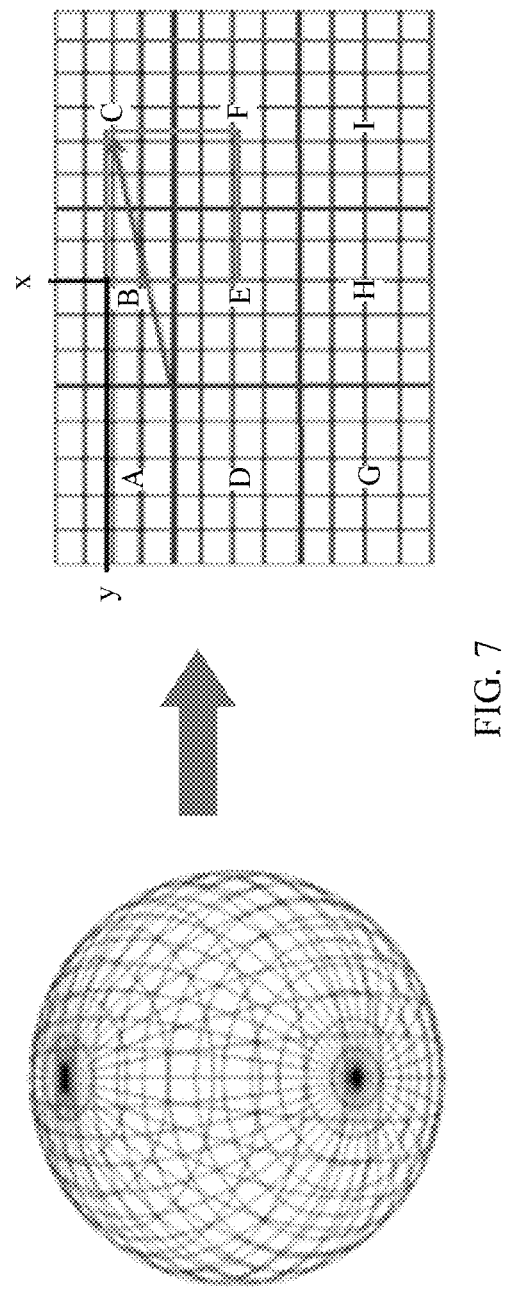
FIG. 7 is a mapping from a spherical surface to a coordinates graph according to an embodiment of the present disclosure.

FIG. 7 is a mapping from a spherical surface to a coordinates graph according to an embodiment of the present disclosure. In the figure, it is assumed that target spatial location information is coordinates of a top-left location of a viewport region in a VR video and width and height information of the viewport region. For example, in FIG. 6, coordinates of a top-left location of a right box in the coordinates graph is (x, y), and a length and a width of the right box is (w, h). In this case, a request of a client carries values of x, y, w, and h; uniform scaling values of x, y, w, and h, or an angle value in a sphere.

In a possible implementation, the target request further includes at least one of: region of interest ROI information, bandwidth information of the client, information about a decoding standard supported by the client, and information about a maximum video resolution of the client. To be specific, when initiating a video request, the client may further add some related parameters of the client, for example, a video playing condition or playing performance, so that the server can perform video stream processing and feedback more properly.

Step S502: The server searches, based on the target spatial location information, for the corresponding target spatial object in the VR content component.

The server searches, based on the target spatial location information in the received target request, for the corresponding target spatial object in the VR component content, to subsequently obtain a video stream corresponding to the target spatial object. For example, after receiving the target request from the client, the server parses the target request to obtain information about a viewport requested by the client, and obtains, from media presentation description information based on the information about a viewport of the client, a video stream having content that overlaps with a viewport region of the client.

Step S503: The server obtains information about a multiplex video stream that is obtained by performing preset multiplexing processing on an original video stream corresponding to the target spatial object.

After determining the target spatial object (for example, a target viewport of the user), the server obtains the information about the multiplex video stream that is obtained by performing the preset multiplexing processing on the original video stream corresponding to the target spatial object. It should be noted that preset multiplexing processing may be performed on the original video stream corresponding to the target spatial object before the server receives the target request, or after the target request is received. If the preset multiplexing processing is performed before the target request is received, a request responding time can be saved. To be specific, after the target spatial object is determined, the pre-processed information about a multiplex video stream that is obtained by performing the preset multiplexing processing on the original video stream corresponding to the target spatial object is directly obtained, so that a response rate of the server is improved, thereby shortening a response time and improving viewing experience of the user. If the preset multiplexing processing is performed after the target request is received, some multiplexing processing time needs to be consumed, but storage space required for massive preset multiplexing processing in advance can be saved. Certainly alternatively, the foregoing two manners may be combined. To be specific, preset multiplexing processing is performed in advance on some content that may be frequently viewed by the user, and content that the user may not need to view is processed and obtained after the target request is received. Therefore, the present disclosure does not limit a time when the server performs the preset multiplexing processing on the original video stream corresponding to the related target spatial object.

For example, the server obtains the corresponding video stream based on information about the video stream having content that overlaps with the viewport region of the client, and performs preset multiplexing processing on the video stream. For example, the right box in the coordinates graph in FIG. 6 is the viewport region requested by the client, and regions A to I are nine regions described in the media presentation description information. A bitstream multiplexing module can deduce, based on information about the right box and location information of the nine regions A to I, that a content region of the right box covers four regions B, C, E, and F. The bitstream multiplexing module obtains video bitstreams corresponding to the four regions B, C, E, and F from a bitstream obtaining module, and multiplexes the four video streams. A multiplex video stream includes description information of the multiplexed video streams. The description information of the video streams includes some or all the following information: a quantity of video streams in the multiplex video stream, spatial region location information of each multiplexed video stream, resolution information of each multiplexed video stream, storage location information of each multiplexed video stream in the multiplex video stream, a video stream multiplexing type, and resolution information of a video source corresponding to each viewport. Specific preset multiplexing processing may be a processing manner such as binary head-to-tail splicing and sample interleaved storage of bitstream files of the multiplexed video stream in a multiplex file.

In a possible implementation, the information about the multiplex video stream includes information about N multiplexed sub video streams that are respectively obtained by performing preset multiplexing processing on N sub video streams. The N sub video streams and the N multiplexed sub video streams are in a one-to-one correspondence. The N sub video streams are corresponding sub video streams generated by dividing the target spatial object into N sub spatial objects and dividing the original video stream based on the N sub spatial objects, and N is a natural number greater than 1. A target request feedback further includes multiplexing description information, and the multiplexing description information includes at least one of the following: a quantity N of the sub video streams that is included in the information about the multiplex video stream; a starting location offset, in the information about the multiplex video stream, of a starting sub video stream of the N sub video streams; a size of the N multiplexed sub video streams; spatial location information, in the VR content component, respectively corresponding to the N multiplexed sub video streams; resolution information of the N multiplexed sub video streams; a video stream multiplexing type of the N multiplexed sub video streams; and resolution information of the N sub video streams. To be specific, a function of different types of information carried in the multiplexing description information is to help the client parse and present, based on the multiplexing description information, the VR video requested by the user.

Step S504: The server sends a target request feedback to the client in response to the target request, and the client receives the target request feedback by which the server responses to the target request, where the target request feedback includes the information about the multiplex video stream that is obtained by performing the preset multiplexing processing on the original video stream corresponding to the target spatial object.

In the prior art, for content that a user requests to obtain, a server directly returns a corresponding video stream. Therefore, there may be a large amount of redundant video stream code, especially in some VR video scenes that have some repeated scenes. For example, in VR experience scenarios in tour and sightseeing, a color of the sky or a color and texture of a river are basically consistent. Therefore, the repeated content can be multiplexed, to reduce a bandwidth and time for transmitting video streams and improve efficiency.

In a possible implementation, the multiplexing description information further includes: the spatial location information, in the VR content component, respectively corresponding to the N multiplexed sub video streams. The multiplexing description information includes specific spatial location information of a plurality of multiplexed sub video streams. Therefore, the client may finally parse and present, based on such information in the multiplexing description information, the VR video that the user needs to watch.

In a possible implementation, the multiplexing description information further includes: spatial location information, in the VR content component, respectively corresponding to the N sub video streams. Therefore, the client can learn of, at any time based on spatial location information of a video stream, a viewport of which a sub video stream is requested, so that when content of the same viewport needs to be viewed subsequently, it is unnecessary to request repeatedly, thereby improving transmission efficiency of a VR video and improving user experience.

In a possible implementation, the preset multiplexing processing includes binary head-to-tail splicing processing on the video stream, binary head-to-tail splicing of video segments, or sample interleaving multiplexing processing. In other words, there may be a plurality of preset multiplexing processing manners. The present disclosure sets no limitation thereto.

Step S505. The client performs video parsing and presentation based on the information about the multiplex video stream.

The client parses a related video stream based on the information about the multiplex video stream carried in the received target request feedback sent by the server, and finally gives a presentation. For example, the client obtains the multiplex video stream; parses the description information, of the multiplexed video streams, in the multiplex video stream; sends the video stream to a decoder for decoding; and presents, based on information described in the description information of the multiplexed video streams, decoded video content of the video stream. In the present disclosure, in addition to multiplexing a video stream corresponding to each viewport, other video streams that need to be transmitted to the client may be further included.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, preset multiplexing processing is performed on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

Figure 8:
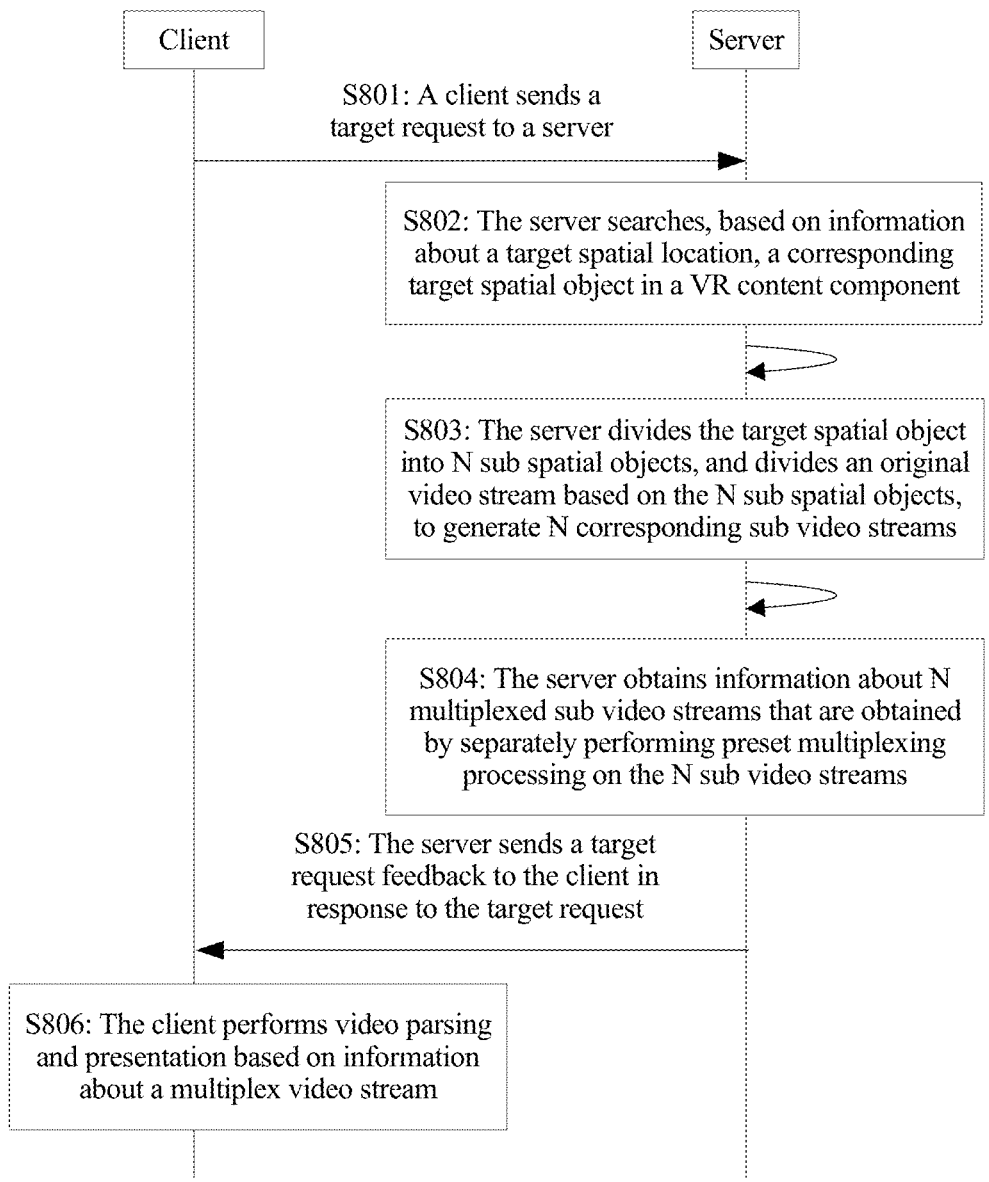
FIG. 8 is a schematic flowchart of another video stream transmission method according to an embodiment of the present disclosure.

FIG. 8 is a schematic flowchart of another video stream transmission method according to an embodiment of the present disclosure. The following describes in detail the another video stream transmission method in this embodiment of the present disclosure from a perspective of interaction between a client and a server with reference to FIG. 8. The method may include the following step S801 to step S805.

Figure 2:
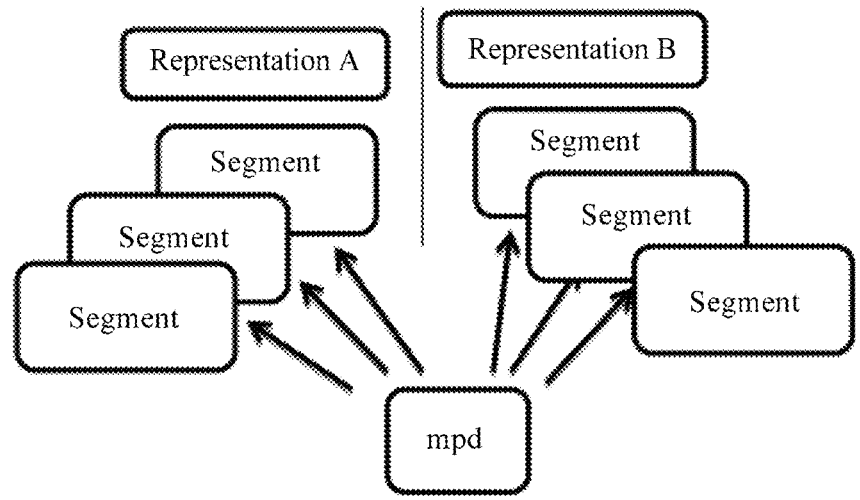
FIG. 2 is a hierarchical structural diagram of an mdp file according to an embodiment of the present disclosure.
Figure 3:
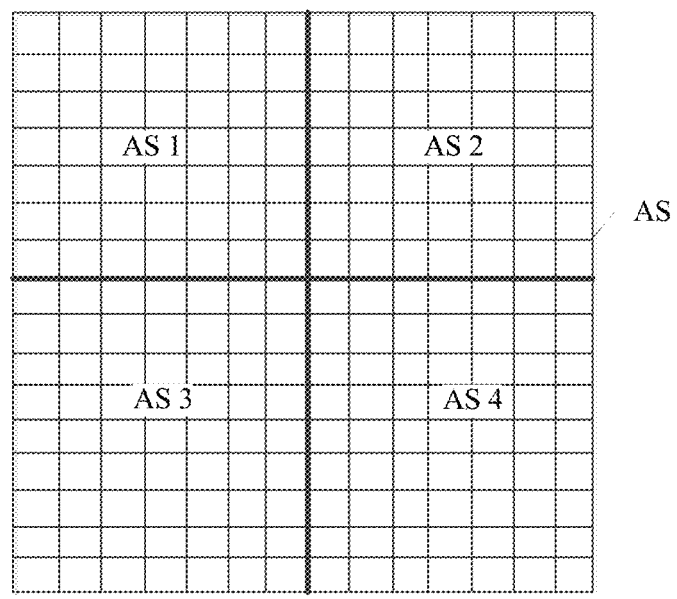
FIG. 3 is a schematic diagram of a spatial relationship between spatial objects according to an embodiment of the present disclosure.

Step S801 and step S802 in the embodiment provided in FIG. 8 are respectively the same as step S501 and step S502 in the embodiment provided in FIG. 2. Specific implementations are not described herein again.

Step S803. The server divides the target spatial object into N sub spatial objects, and encodes the N sub spatial objects to generate N corresponding sub video streams, where N is natural number greater than 1.

The target spatial object is divided into a plurality of sub spatial objects, so that different sub video streams corresponding to a plurality of spaces can be multiplexed in a more refined manner, thereby further improving video stream multiplexing efficiency. A principle of dividing the target spatial object into N sub spatial objects may be dividing according to continuity of spatial location or may be dividing based on content or overlapping in a video.

Step S804: The server obtains information about N multiplexed sub video streams that are obtained by separately performing preset multiplexing processing on the N sub video streams.

After determining a plurality of sub spatial objects, the server obtains information about a plurality of multiplexed sub video streams that are obtained by performing preset multiplexing processing on the plurality of sub spatial objects, to finally transmit the information to the client at a relatively small code rate, thereby reducing a bandwidth and improving transmission efficiency. It can be understood that the preset multiplexing processing may be performed in advance, or the preset multiplexing processing may be performed after a sub space is determined Step S805 and step S806 in the embodiment provided in FIG. 8 are respectively the same as step S504 and step S505 in the embodiment provided in FIG. 5. Specific implementations are not described herein again.

Further, the several description manners of the multiplexing description information related to the preset multiplexing processing of the video stream in the foregoing embodiment may be implemented by using any of the following specific description manners:

Description Manner 1:
aligned(8) class FOVMuxBox extends FullBox('form', version, flag) {
  unsigned int(16) FOVCount;
  unsigned int(32) first_offset;
  for(i=1; i<=FOVCount; i++)
  {
    unsigned int(32) FOV_size
  }
}
where:

FOVCount: a quantity of sub video streams that is in information about a multiplex video stream;

first_offset: an offset, in the multiplex video stream, of a sub video stream of a first viewport in the information about the multiplex video stream; and FOV_size: a size of each multiplexed sub video stream in the multiplex video stream.

1. A client receives the information about the multiplex video stream, and parses description information of multiplexed video streams in 'fovm', to obtain a quantity of sub video streams and offset and size information of the sub video streams.

2. Initialize a plurality of video stream decoders based on the quantity of sub video streams.

3. De-multiplex, based on the offset and data volume information of each sub video stream, an obtained multiplexed video stream to obtain data of each video stream; and send the data of each video stream to a corresponding video stream decoder for decoding and presentation.

Figure 9:
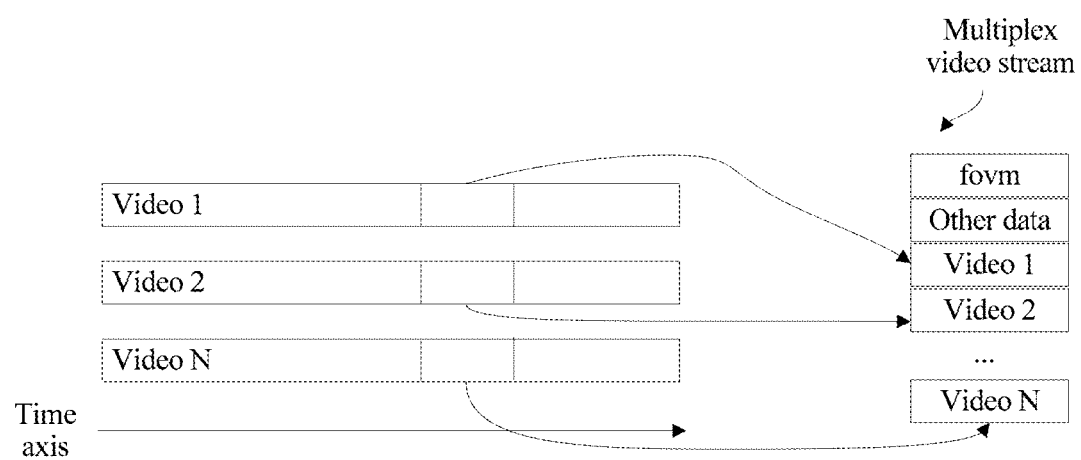
FIG. 9 is a schematic diagram of a multiplex video stream according to an embodiment of the present disclosure.

FIG. 9 is a schematic diagram of a multiplex video stream according to an embodiment of the present disclosure. In FIG. 9, a video 1 to a video n are video content in a same time segment, and other data may not exist; and first_offset is a starting location offset of the video 1.

Description Manner 2:
aligned(8) class FOVMuxBox extends FullBox('fovm', version, flag) {
  unsigned int(16) FOVCount;
  unsigned int(32) first_offset;
  for(i=1; i<=FOVCount; i++)
  {
    unsigned int(32) x;
    unsigned int(32) y;
    unsigned int(32) w;
    unsigned int(32) h;
    unsigned int(31) FOV_size
  }
} x: information about an x-axis location, of each of N multiplexed sub video streams, in a VR content component;

y: information about a y-axis location, of each of the N multiplexed sub video streams, in the VR content component;

w: a width of the N multiplexed sub video streams; and h: a height of the N multiplexed sub video streams.

Actions of a client after a multiplex stream is received are as follows:

1. The first three steps are the same as the actions of the client in the description manner 1. In step 4, pictures obtained through decoding are spliced and presented based on the information of x, y, w, and h in fovm.

Step 5: Present spliced video stream content based on ROI information carried in a request of the client.

Description Manner 3:
aligned(8) class FOVMuxBox extends FullBox('fovm', version, flag) {
  unsigned int(16) FOVCount;
  unsigned int(32) first_offset;
  unsigned int(32) ROI_x;
  unsigned int(32) ROI_y;
  unsigned int(32) ROI_w;
  unsigned int(32) ROI_h;
  for(i=1; i<=FOVCount; i++)
  {
    unsigned int(32) x;
    unsigned int(32) y;
    unsigned int(32) w;
    unsigned int(32) h;
    unsigned int(31) FOV_size
  }
}

ROI_x: information about a corresponding x-axis location, of each of N sub video streams requested by a client, in a VR content component;

ROI_y: information about a corresponding y-axis location, of each of the N sub video streams requested by the client, in the VR content component;

ROI_w: a width of the N sub video streams requested by the client; and

ROI_h: a height of the N sub video streams requested by the client.

The ROI information added in this description manner may be used together with the information in the description manners 1 and 2.

1. Steps 1 to 4 are the same as the actions of the client in the description manner 2. In step 5: in content obtained by splicing a plurality of fields of view, video content in a region specified by ROI_x, ROI_y, ROI_w, and ROI_h is presented.

Description Manner 4:
aligned(8) class FOVMuxBox extends FullBox('fovm', version, flag) {
  unsigned int(16) FOVCount;
  unsigned int(32) first_offset;
  unsigned int(16) MultiplexType;

```
if(MultiplexType==FOV)
{
for(i=1; i<=FOVCount; i++)
    {
        unsigned int(31) FOV_size
    }
}
if(MultiplexType==sample)
{
for(i=1; i<=FOVCount; i++)
    {
        unsigned int(32) sampleCount;
        for(j=1; j<=sampleCount; i++)
        {
            unsigned int(32) sample_offset;
            unsigned int(32) sample_size;
        }
    }
}
}
```

MultiplexType: a manner of multiplexing bitstream files of multiplexed video streams in a multiplex file: binary head-to-tail splicing of bitstreams (bitstream segments) of the video streams, or sample interleaving multiplexing in each video stream;

sample_offset: an offset of a sample in a multiplex file; and sample_size: a size of the sample.

The syntax in this example can be used together with the foregoing description manners 1, 2, and 3.

Actions of a client after receiving a multiplex video stream are as follows:

1. After receiving the multiplex video stream, the client parses description information of multiplexed video streams in 'fovm', to obtain manner information in the multiplex video stream.

Figure 10:
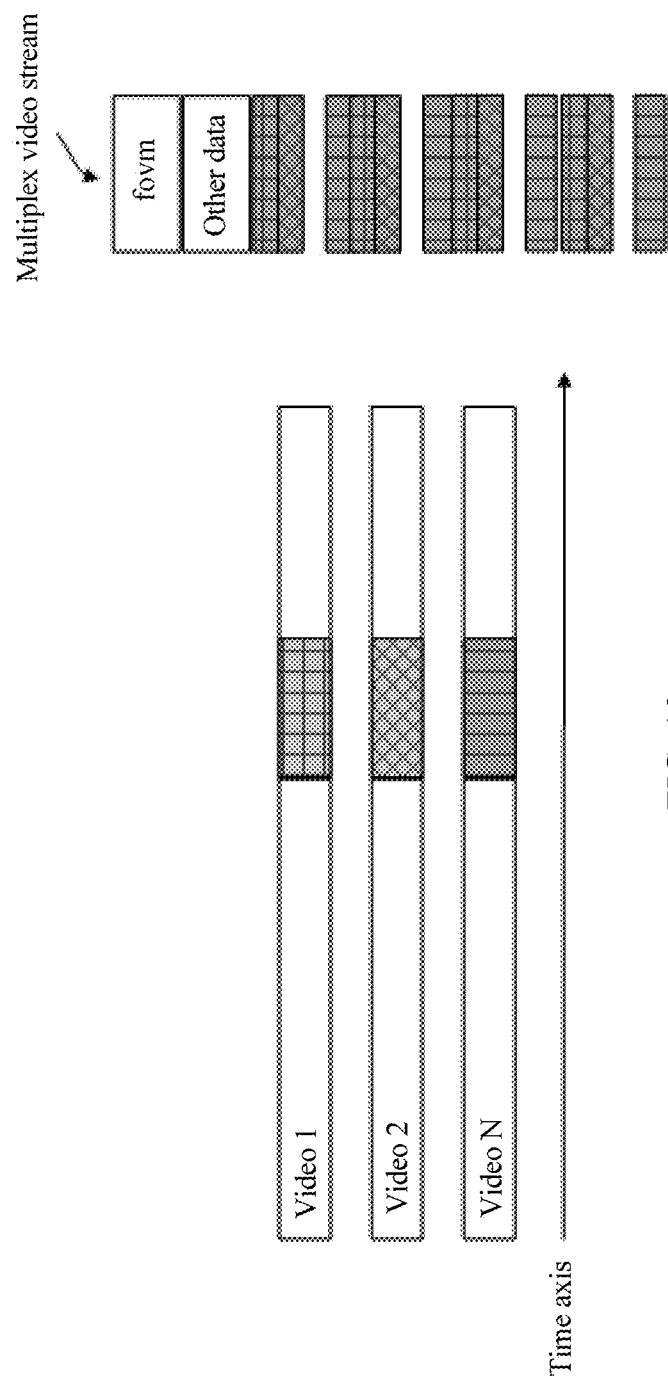
FIG. 10 is a schematic diagram of sample interleaving multiplexing in a video stream according to an embodiment of the present disclosure.

2. The client determines, based on the information about the multiplexing manner, a multiplexing manner of data of each viewport. If the multiplexing manner is head-to-tail splicing, the client parses offset information and data volume information, and sends the data of each viewport to a decoder. If the multiplexing manner is sample interleaving, the client parses offset and data volume information of each sample, and sends each sample to a corresponding decoder. FIG. 10 is a schematic diagram of sample interleaving multiplexing in a video stream according to an embodiment of the present disclosure. In the figure, videos (videos 1, 2, and 3) of different fields of view are multiplexed in an interleaving manner. Sub video streams indicated by graticule lines, oblique lines, and vertical lines can be multiplexed in an interleaving manner. A result of the multiplexing is a multiplex video stream on a right side in FIG. 10.

Description Manner 5:
```
aligned(8) class FOVMuxBox extends FullBox('fovm', version, flag) {
    unsigned int(16) FOVCount;
    unsigned int(32) first_offset;
    unsigned int(32) source_w;
    unsigned int(32) source_h;
    for(i=1; i<=FOVCount; i++)
    {
        unsigned int(32) x;
        unsigned int(32) y;
        unsigned int(32) w;
        unsigned int(32) h;
        unsigned int(31) FOV_size
    }
}
or
aligned(8) class FOVMuxBox extends FullBox('fovm', version, flag) {
    unsigned int(16) FOVCount;
    unsigned int(32) first_offset;
    for(i=1; i<=FOVCount; i++)
    {
        unsigned int(32) source_w;
        unsigned int(32) source_h;
        unsigned int(32) x;
        unsigned int(32) y;
        unsigned int(32) w;
        unsigned int(32) h;
        unsigned int(31) FOV_size
    }
}
```

In this description manner, resolution information of a video source corresponding to each video stream is added, and source_w and source_h are respectively a width and a height of a video source corresponding to a viewport.

Syntax of each spatial location in the foregoing five description manners may be absolute location information in VR video content, or may be a scale value or a yaw angle.

In this embodiment of the present disclosure, the request information of the client carries, in a get request of HTTP by using an HTTP protocol, information about a viewport region of the client, for example, x, y, w, and h in this embodiment.

In this embodiment of the present disclosure, the request information of the client may further carry information such as a bandwidth of the client, a decoding standard supported by the client, and a maximum video resolution. The server selects, based on the information carried in the request, a video stream meeting a performance requirement of the client, for multiplexing and transmission.

In this embodiment of the present disclosure, multiplexed video stream data may be segment media data in a DASH protocol.

In this embodiment of the present disclosure, a related bitstream in multiplexing may include a bitstream that is generated on a server side and that is corresponding to content that partially or entirely overlaps with a content region requested by a client.

This embodiment of the present disclosure retains the method and corresponding beneficial effects in the embodiment of FIG. 5, and describes in detail a plurality of specific implementations of preset multiplexing processing. This further enhances implementability of the present disclosure and further improves video stream transmission efficiency.

To better implement the video stream transmission methods corresponding to FIG. 5 and FIG. 8 in the embodiments of the present disclosure, the present disclosure further provides a related device for realizing and implementing the foregoing methods.

Figure 11:
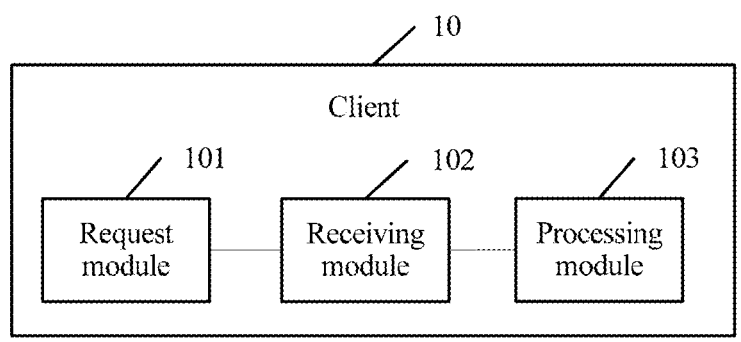
FIG. 11 is a schematic structural diagram of a client according to an embodiment of the present disclosure.

FIG. 11 is a schematic structural diagram of a client according to an embodiment of the present disclosure. As shown in FIG. 11, a client 10 includes a request module 101, a receiving module 102, and a processing module 103.

The request module 101 is configured to send a target request to a server, where the target request includes information about a corresponding target spatial location, of a target spatial object that needs to be presented upon request by the client, in a virtual reality VR content component.

The receiving module 102 is configured to receive a target request feedback by which the server responds to the target request, where the target request feedback includes information about a multiplex video stream that is obtained by performing preset multiplexing processing on an original video stream corresponding to the target spatial object.

The processing module 103 is configured to perform video parsing and presentation based on the information about the multiplex video stream.

The information about the multiplex video stream includes information about N multiplexed sub video streams that are respectively obtained by performing preset multiplexing processing on N sub video streams, the N sub video streams are corresponding sub video streams generated by dividing the target spatial object into N sub spatial objects and encoding the N sub spatial objects, N is a natural number greater than 1, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a data volume of the N multiplexed sub video streams;

spatial location information, in the VR content component, respectively corresponding to the N multiplexed sub video streams;

resolution information of the N multiplexed sub video streams; and a video stream multiplexing type of the N multiplexed sub video streams.

Further, the multiplexing description information further includes:

the spatial location information, in the VR content component, respectively corresponding to the N multiplexed sub video streams.

Even further, the multiplexing description information further includes:

spatial location information, in the VR content component, respectively corresponding to the N sub video streams.

Even further, the target request further includes at least one of: region of interest ROI information, bandwidth information of the client, information about a decoding standard supported by the client, and information about a maximum video resolution of the client.

Even further, the preset multiplexing processing includes binary head-to-tail splicing processing on the video stream, binary head-to-tail splicing of video segments, or sample interleaving multiplexing processing.

It can be understood that, for functions of the modules in the client 10, reference may be correspondingly made to specific implementations in the method embodiments in FIG. 5 to FIG. 10. Details are not described herein again.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

Figure 12:
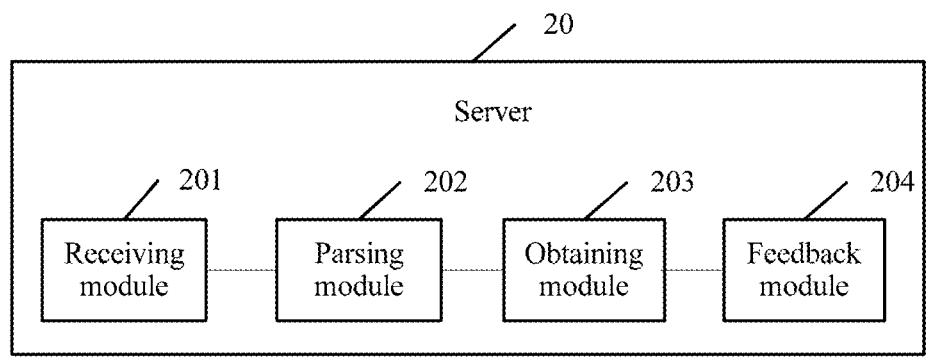
FIG. 12 is a schematic structural diagram of a server according to an embodiment of the present disclosure.

FIG. 12 is a schematic structural diagram of a server according to an embodiment of the present disclosure. As shown in FIG. 12, a server 20 includes a receiving module 201, a parsing module 202, an obtaining module 203, and a feedback module 204.

The receiving module 201 is configured to receive a target request sent by a client, where the target request includes information about a corresponding target spatial location, of a target spatial object that needs to be presented upon request by the client, in a virtual reality VR content component.

The parsing module 202 is configured to search, based on the target spatial location information, for the corresponding target spatial object in the VR content component.

The obtaining module 203 is configured to obtain information about a multiplex video stream that is obtained by performing preset multiplexing processing on an original video stream corresponding to the target spatial object.

The feedback module 204 is configured to send a target request feedback to the client in response to the target request, where the target request feedback includes the information about the multiplex video stream.

The obtaining module 203 includes:

a dividing unit, configured to divide the target spatial object into N sub spatial objects, and divide the original video stream based on the N sub spatial objects, to generate N corresponding sub video streams, where N is natural number greater than 1; and an obtaining unit, configured to obtain information about N multiplexed sub video streams that are obtained by separately performing the preset multiplexing processing on the N sub video streams.

Further, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a size of the N multiplexed sub video streams;

spatial location information, in the VR content component, respectively corresponding to the N multiplexed sub video streams;

resolution information of the N multiplexed sub video streams; and a video stream multiplexing type of the N multiplexed sub video streams.

Even further, the multiplexing description information further includes:

the spatial location information, in the VR content component, respectively corresponding to the N multiplexed sub video streams.

Even further, the multiplexing description information further includes:

spatial location information, in the VR content component, respectively corresponding to the N sub video streams.

Even further, the preset multiplexing processing includes binary head-to-tail splicing processing on the video stream, binary head-to-tail splicing of video segments, or sample interleaving multiplexing processing.

It can be understood that, for functions of the modules in the server 20, reference may be correspondingly made to specific implementations in the method embodiments in FIG. 5 to FIG. 10. Details are not described herein again.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

Figure 13:
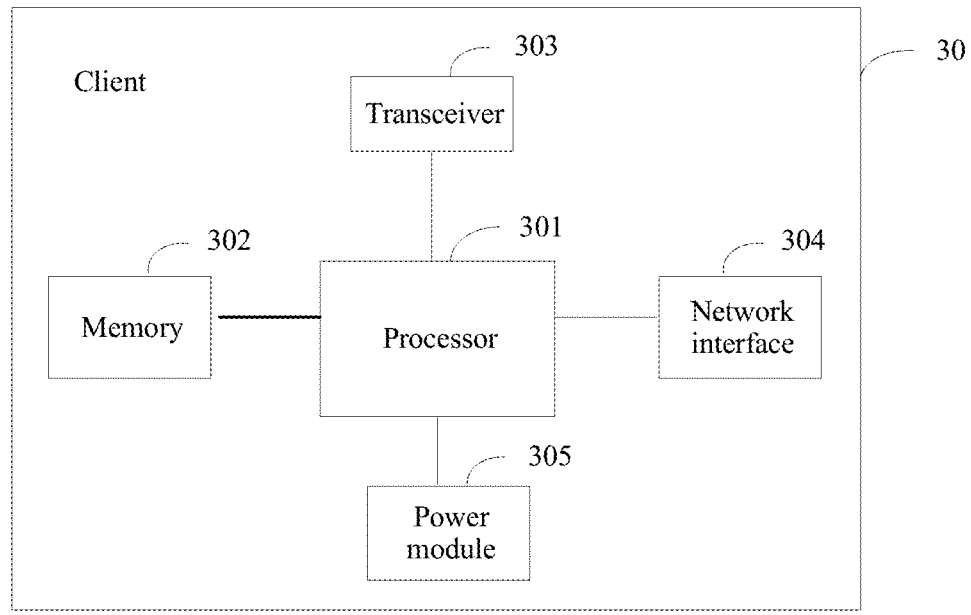
FIG. 13 is a schematic structural diagram of another client according to an embodiment of the present disclosure.

FIG. 13 is a schematic structural diagram of another client according to an embodiment of the present disclosure. As shown in FIG. 13, a client 30 includes a processor 301, a memory 302, and a transceiver 303. The processor 301, the memory 302, and the transceiver 303 may be connected by using a bus or in another manner.

Optionally, the client 30 may further include a network interface 304 and a power module 305.

The processor 301 may be a digital signal processing (Digital Signal Processing, DSP) chip.

The memory 302 is configured to store an instruction. In specific implementation, the memory 302 may use a read-only memory (English: Read-Only Memory, ROM for short) or a random access memory (English: Random Access Memory, RAM for short). In this embodiment of the present disclosure, the memory 302 is configured to store code of a video stream transmission program.

The transceiver 303 is configured to transmit and receive a signal.

The network interface 304 is used by the client 30 to perform data communication with another device. The network interface 304 may be a wired interface or a wireless interface.

The power module 305 is configured to supply power to each module of the client 30.

The processor 301 is configured to call the instruction stored in the memory 302 to perform the following operations:

sending a target request to a server by using the transceiver 303, where the target request includes information about a corresponding target spatial location, of a target spatial object that needs to be presented upon request by the client, in a virtual reality VR content component;

receiving, by using the transceiver 303, a target request feedback by which the server responds to the target request, where the target request feedback includes information about a multiplex video stream that is obtained by performing preset multiplexing processing on an original video stream corresponding to the target spatial object; and performing video parsing and presentation based on the information about the multiplex video stream.

The information about the multiplex video stream includes information about N multiplexed sub video streams that are respectively obtained by performing preset multiplexing processing on N sub video streams, the N sub video streams are corresponding sub video streams generated by dividing the target spatial object into N sub spatial objects and dividing the original video stream based on the N sub spatial objects, N is a natural number greater than 1, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a size of the N multiplexed sub video streams;

spatial location information, in the VR content component, respectively corresponding to the N multiplexed sub video streams;

resolution information of the N multiplexed sub video streams; and a video stream multiplexing type of the N multiplexed sub video streams.

Further, the multiplexing description information further includes:

the spatial location information, in the VR content component, respectively corresponding to the N multiplexed sub video streams.

Even further, the multiplexing description information further includes:

spatial location information, in the VR content component, respectively corresponding to the N sub video streams.

Even further, the target request further includes at least one of: region of interest ROI information, bandwidth information of the client, information about a decoding standard supported by the client, and information about a maximum video resolution of the client.

Even further, the preset multiplexing processing includes binary head-to-tail splicing processing on the video stream, binary head-to-tail splicing of video segments, or sample interleaving multiplexing processing.

It should be noted that, for functions of the functional modules in the client 30 described in this embodiment of the present disclosure, reference may be made to related descriptions of the corresponding client in the embodiments shown in FIG. 5 to FIG. 10. Details are not described herein again.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

Figure 14:
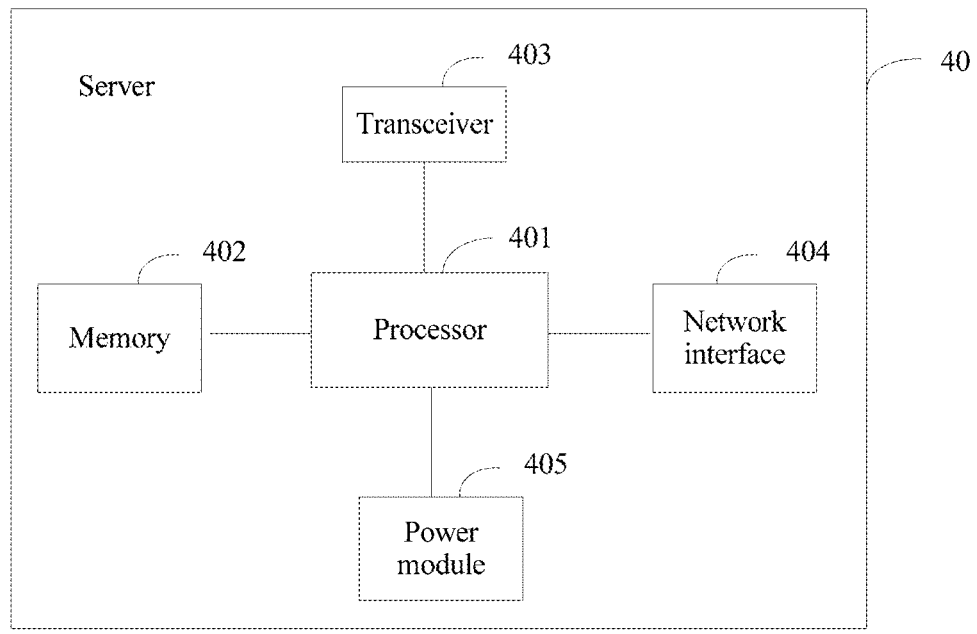
FIG. 14 is a schematic structural diagram of another server according to an embodiment of the present disclosure.

FIG. 14 is a schematic structural diagram of another server according to an embodiment of the present disclosure. As shown in FIG. 14, a server 40 includes a processor 401, a memory 402, and a transceiver 403. The processor 401, the memory 402, and the transceiver 403 may be connected by using a bus or in another manner.

Optionally, the server 40 may further include a network interface 404 and a power module 405.

The processor 401 may be a digital signal processing (Digital Signal Processing, DSP) chip.

The memory 402 is configured to store an instruction. In specific implementation, the memory 402 may use a read-only memory (English: Read-Only Memory, ROM for short) or a random access memory (English: Random Access Memory, RAM for short). In this embodiment of the present disclosure, the memory 402 is configured to store code of a video stream transmission program.

The transceiver 403 is configured to transmit and receive a signal.

The network interface 404 is used by the server 40 to perform data communication with another device. The network interface 404 may be a wired interface or a wireless interface.

The power module 405 is configured to supply power to each module of the server 40.

The processor 401 is configured to call the instruction stored in the memory 402 to perform the following operations:

receiving, by using the transceiver 403, a target request sent by a client, where the target request includes information about a corresponding target spatial location, of a target spatial object that needs to be presented upon request by the client, in a virtual reality VR content component;

searching, based on the target spatial location information, for the corresponding target spatial object in the VR content component;

obtaining information about a multiplex video stream that is obtained by performing preset multiplexing processing on an original video stream corresponding to the target spatial object; and sending, by using the transceiver 403, a target request feedback to the client in response to the target request, where the target request feedback includes the information about the multiplex video stream.

That the processor 401 is configured to obtain information about a multiplex video stream that is obtained by performing preset multiplexing processing on an original video stream corresponding to the target spatial object is:

dividing the target spatial object into N sub spatial objects, and encoding the N sub spatial objects to generate N corresponding sub video streams, where N is natural number greater than 1; and obtaining information about N multiplexed sub video streams that are obtained by separately performing the preset multiplexing processing on the N sub video streams.

Further, the target request feedback further includes multiplexing description information, and the multiplexing description information includes at least one of the following:

a quantity N of the sub video streams that is included in the information about the multiplex video stream;

a starting location offset, in the information about the multiplex video stream, of a starting sub video stream of the N sub video streams;

a data volume of the N multiplexed sub video streams;

spatial location information, in the VR content component, respectively corresponding to the N multiplexed sub video streams;

resolution information of the N multiplexed sub video streams;

a video stream multiplexing type of the N multiplexed sub video streams; and resolution information of the N sub video streams.

Even further, the multiplexing description information further includes:

the spatial location information, in the VR content component, respectively corresponding to the N multiplexed sub video streams.

Even further, the multiplexing description information further includes:

spatial location information, in the VR content component, respectively corresponding to the N sub video streams.

Even further, the preset multiplexing processing includes binary head-to-tail splicing processing on the video stream, binary head-to-tail splicing of video segments, or sample interleaving multiplexing processing.

It should be noted that, for functions of the functional modules in the server 40 described in this embodiment of the present disclosure, reference may be made to related descriptions of the corresponding server in the embodiments shown in FIG. 5 to FIG. 10. Details are not described herein again.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

Figure 15:
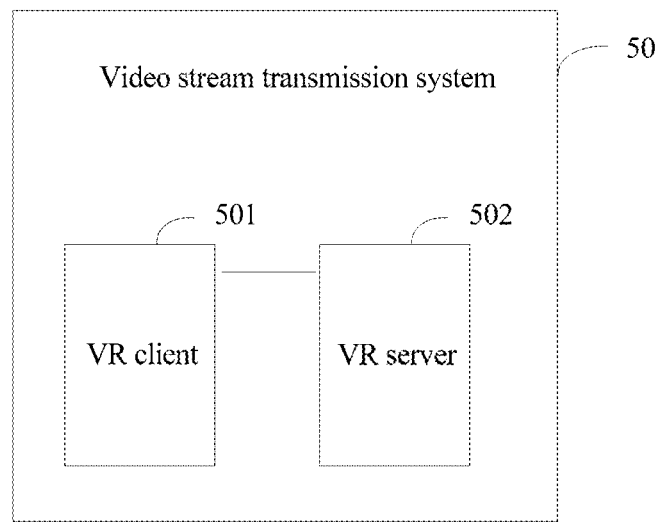
FIG. 15 is a schematic structural diagram of a video stream transmission system according to an embodiment of the present disclosure.
Figure 16:
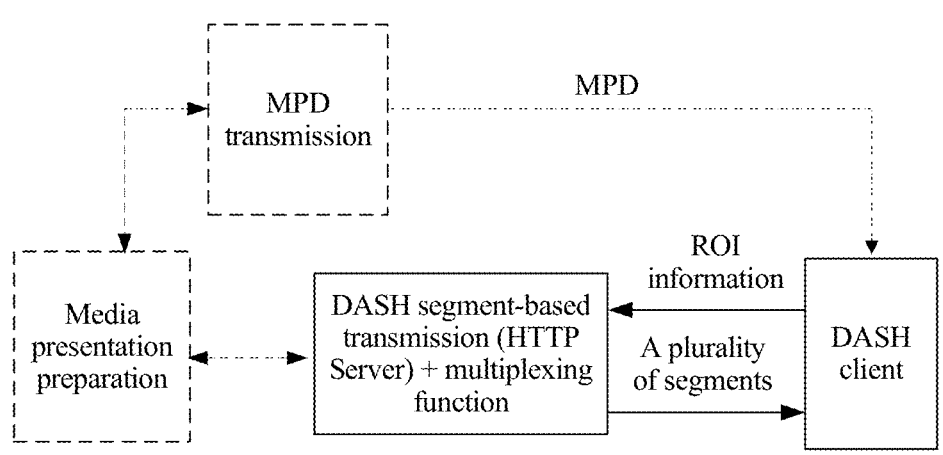
FIG. 16 is a schematic architectural diagram of a segment-based multiplexing system according to an embodiment of the present disclosure.

FIG. 15 is a schematic structural diagram of a video stream transmission system according to an embodiment of the present disclosure. A video stream transmission system 50 includes a VR client 501 and VR server 502.

The VR client 501 may be the client 30 in the embodiment of FIG. 13, and the VR server 502 is the server 40 in the embodiment FIG. 14. It can be understood that the video stream transmission system 50 in this embodiment of the present disclosure may further include devices such as a photographic device, a storage device, a routing device, a switching device, and a core network server.

In this embodiment of the present disclosure, the server multiplexes and encapsulates, based on viewport location information in request information of the client, a video stream related to the viewport location information, and transmits an encapsulated multiplex video stream to the client. The video stream related to the viewport location information is a video stream having video content that partially or entirely overlaps with content of a viewport range requested by the client. To be specific, the server performs preset multiplexing processing on a video stream that responds to the request, to respond to the request from the client. This reduces a quantity of requests from the client, and also reduces a quantity of responses from the server. In addition, this ensures simultaneous arrival of video stream information of fields of view of a same moment, thereby reducing a time of waiting for all video streams to be separately received, and reducing a presentation delay of the fields of view.

The embodiments of the present disclosure further provide a computer storage medium. The computer storage medium may store a program. When the program is executed, some or all of the steps of any video stream transmission method in the foregoing method embodiments are performed.

In the foregoing embodiments, the description of each embodiment has respective focuses. For a part that is not described in detail in an embodiment, refer to related descriptions in other embodiments.

It should be noted that, to simplify description, the foregoing method embodiments are expressed as a combination of a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device, and may be a processor in a computer device) to perform all or some of the steps of the foregoing methods described in the embodiments of the present disclosure. The foregoing storage medium may include: any medium that can store program code, such as a USB flash drive, a removable hard disk, a magnetic disk, an optical disc, a read-only memory (English: Read-Only Memory, ROM for short), or a random access memory (English: Random Access Memory, RAM for short).

The foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A video stream transmission method, comprising:
   sending, by a client terminal device, a target request to a server, wherein the target request comprises information about a corresponding target spatial location of a target spatial object that needs to be presented upon request by the client terminal device in a virtual reality VR content component;
   receiving, by the client terminal device, a target request feedback by which the server responds to the target request, wherein the target request feedback comprises information about a multiplex video stream that is obtained by performing preset multiplexing processing on an original video stream corresponding to the target spatial object; and
   performing, by the client terminal device, video parsing and presentation based on the information about the multiplex video stream,
   wherein the information about the multiplex video stream comprises information about N multiplexed sub-video streams that are respectively obtained by performing preset multiplexing processing on N sub-video streams, wherein the N sub-video streams are corresponding sub-video streams generated by dividing the target spatial object into N sub-spatial objects and dividing the original video stream based on the N sub-spatial objects, wherein N is a natural number greater than 1, wherein the target request feedback further comprises multiplexing description information, and wherein the multiplexing description information comprises at least one of the following:
   a quantity N of the sub-video streams that is comprised in the information about the multiplex video stream;
   a starting location offset in the information about the multiplex video stream of a starting sub-video stream of the N sub-video streams;
   a size of the N multiplexed sub-video streams,
   spatial location information in the VR content component respectively corresponding to the N multiplexed sub-video streams;
   resolution information of the N multiplexed sub-video streams;
   a video stream multiplexing type of the N multiplexed sub-video streams;
   or resolution information of the N sub-video streams.

2. The method according to claim 1, wherein the multiplexing description information further comprises:
   spatial location information, in the VR content component, respectively corresponding to the N sub-video streams.

3. The method according to claim 1, wherein the target request further comprises at least one of: region of interest (ROI) information, bandwidth information of the client, information about a decoding standard supported by the client, and information about a maximum video resolution of the client.

4. The method according to claim 1, wherein the preset multiplexing processing comprises at least one of binary head-to-tail splicing processing on the video stream, binary head-to-tail splicing of video segments, or sample interleaving multiplexing processing.

5. A video stream transmission method, comprising:
receiving, by a server, a target request sent by a client terminal device, wherein the target request comprises information about a corresponding target spatial location of a target spatial object that needs to be presented upon request by the client terminal device in a virtual reality VR content component;
searching, by the server based on the target spatial location information, for the corresponding target spatial object in the VR content component;
obtaining, by the server, information about a multiplex video stream that is obtained by performing preset multiplexing processing on an original video stream corresponding to the target spatial object; and
sending, by the server, a target request feedback to the client in response to the target request, wherein the target request feedback comprises the information about the multiplex video stream,
wherein the obtaining, by the server, information about a multiplex video stream that is obtained by performing preset multiplexing processing on an original video stream corresponding to the target spatial object comprises:
dividing, by the server, the target spatial object into N sub-spatial objects, and dividing the original video stream based on the N sub-spatial objects, to generate N corresponding sub-video streams, wherein N is natural number greater than 1; and
obtaining, by the server, information about N multiplexed sub-video streams that are obtained by separately performing the preset multiplexing processing on the N sub-video streams.

6. The method according to claim 5, wherein the target request feedback further comprises multiplexing description information, and wherein the multiplexing description information comprises at least one of the following:
a quantity N of the sub-video streams that is comprised in the information about the multiplex video stream;
a starting location offset, in the information about the multiplex video stream, of a starting sub-video stream of the N sub-video streams;
a size of the N multiplexed sub-video streams;
spatial location information, in the VR content component, respectively corresponding to the N multiplexed sub-video streams;
resolution information of the N multiplexed sub-video streams;
a video stream multiplexing type of the N multiplexed sub-video streams; or
resolution information of the N sub-video streams.

7. The method according to claim 6, wherein the multiplexing description information further comprises:
spatial location information, in the VR content component, respectively corresponding to the N sub-video streams.

8. The method according to claim 5, wherein the preset multiplexing processing comprises binary head-to-tail splicing processing on the video stream, binary head-to-tail splicing of video segments, or sample interleaving multiplexing processing.

9. A client terminal device, comprising:
at least one processor;
a non-transitory computer-readable storage medium coupled to the at least one processor and storing programming instructions for execution by the at least one processor, wherein the programming instructions instruct the at least one processor to:
send a target request to a server, wherein the target request comprises information about a corresponding target spatial location, of a target spatial object that needs to be presented upon request by the client terminal device, in a virtual reality VR content component;
receive a target request feedback by which the server responds to the target request, wherein the target request feedback comprises information about a multiplex video stream that is obtained by performing preset multiplexing processing on an original video stream corresponding to the target spatial object; and
perform video parsing and presentation based on the information about the multiplex video stream, wherein the information about the multiplex video stream comprises information about N multiplexed sub-video streams that are respectively obtained by performing preset multiplexing processing on N sub-video streams, wherein the N sub-video streams are corresponding sub-video streams generated by dividing the target spatial object into N sub-spatial objects and dividing the original video stream based on the N sub-spatial objects, wherein N is a natural number greater than 1, wherein the target request feedback further comprises multiplexing description information, and wherein the multiplexing description information comprises at least one of the following:
a quantity N of the sub-video streams that is comprised in the information about the multiplex video stream;
a starting location offset, in the information about the multiplex video stream, of a starting sub-video stream of the N sub-video streams;
a size of the N multiplexed sub-video streams;
spatial location information, in the VR content component, respectively corresponding to the N multiplexed sub-video streams;
resolution information of the N multiplexed sub-video streams;
a video stream multiplexing type of the N multiplexed sub-video streams;
or resolution information of the N sub-video streams.

10. The client terminal device according to claim 9, wherein the multiplexing description information further comprises: spatial location information, in the VR content component, respectively corresponding to the N sub-video streams.

11. The client terminal device according to claim 9, wherein the target request further comprises at least one of: region of interest (ROI) information, bandwidth information of the client, information about a decoding standard supported by the client, and information about a maximum video resolution of the client terminal device.

12. The client terminal device according to claim 9, wherein the preset multiplexing processing comprises at least one of binary head-to-tail splicing processing on the video stream, binary head-to-tail splicing of video segments, or sample interleaving multiplexing processing.

13. A server, comprising:
at least one processor;
a non-transitory computer-readable storage medium coupled to the at least one processor and storing programming instructions for execution by the at least one processor, wherein the programming instructions instruct the at least one processor to:
  receive a target request sent by a client, wherein the target request comprises information about a corresponding target spatial location, of a target spatial object that needs to be presented upon request by the client, in a virtual reality VR content component;
  search, based on the target spatial location information, for the corresponding target spatial object in the VR content component;
  obtain information about a multiplex video stream that is obtained by performing preset multiplexing processing on an original video stream corresponding to the target spatial object; and
  send a target request feedback to the client in response to the target request, wherein the target request feedback comprises the information about the multiplex video stream;
wherein obtaining information about the multiplex video stream that is obtained by performing preset multiplexing processing on the original video stream corresponding to the target spatial object comprises:
dividing the target spatial object into N sub-spatial objects, and dividing the original video stream based on the N sub-spatial objects, to generate N corresponding sub-video streams, wherein N is natural number greater than 1; and
  obtaining information about N multiplexed sub-video streams that are obtained by separately performing the preset multiplexing processing on the N sub-video streams.

14. The server according to claim 13, wherein the target request feedback further comprises multiplexing description information, and the multiplexing description information comprises at least one of the following:
  a quantity N of the sub-video streams that is comprised in the information about the multiplex video stream;
  a starting location offset, in the information about the multiplex video stream, of a starting sub-video stream of the N sub-video streams;
  a size of the N multiplexed sub-video streams;
  spatial location information, in the VR content component, respectively corresponding to the N multiplexed sub-video streams;
  resolution information of the N multiplexed sub-video streams;
  a video stream multiplexing type of the N multiplexed sub-video streams; or
  resolution information of the N sub-video streams.

15. The server according to claim 14, wherein the multiplexing description information further comprises:
  spatial location information, in the VR content component, respectively corresponding to the N sub-video streams.

16. The server according to claim 13, wherein the preset multiplexing processing comprises at least one of binary head-to-tail splicing processing on the video stream, binary head-to-tail splicing of video segments, or sample interleaving multiplexing processing.

* * * * *